(12) United States Patent
Hirai

(10) Patent No.: US 7,983,530 B2
(45) Date of Patent: Jul. 19, 2011

(54) RECORDING AND PLAYBACK APPARATUS AND RECORDING AND PLAYBACK METHOD, RECORDING APPARATUS AND RECORDING METHOD, PLAYBACK APPARATUS AND PLAYBACK METHOD, AND PROGRAM

(75) Inventor: Jun Hirai, Tokyo (JP)

(73) Assignee: Sony Corporation (JP)

( * ) Notice: Subject to any disclaimer, the term of this patent is extended or adjusted under 35 U.S.C. 154(b) by 1289 days.

(21) Appl. No.: 11/594,004

(22) Filed: Nov. 7, 2006

(65) Prior Publication Data

US 2007/0122131 A1 May 31, 2007

(30) Foreign Application Priority Data

Nov. 7, 2005 (JP) ............................... P2005-322405

(51) Int. Cl.
*H04N 5/84* (2006.01)
(52) U.S. Cl. ........................................ 386/335; 386/337
(58) Field of Classification Search .................... 386/46, 386/95, 111, 112, 124, 125; 375/240, 240.16
See application file for complete search history.

(56) References Cited

U.S. PATENT DOCUMENTS

| | | | | |
|---|---|---|---|---|
| 4,963,995 A | * | 10/1990 | Lang | ............................. 386/54 |
| 5,647,049 A | * | 7/1997 | Odaka et al. | .................. 386/124 |
| 5,844,613 A | | 12/1998 | Chaddha | |
| 5,901,249 A | | 5/1999 | Ito | |
| 5,929,911 A | | 7/1999 | Cheney et al. | |
| 6,236,682 B1 | | 5/2001 | Ota et al. | |
| 6,553,071 B1 | | 4/2003 | Kim et al. | |
| 6,718,064 B1 | | 4/2004 | Abe et al. | |
| 2003/0103562 A1 | | 6/2003 | Sugiyama | |
| 2004/0165663 A1 | | 8/2004 | Hanami | |
| 2004/0190619 A1 | | 9/2004 | Lee et al. | |
| 2005/0053295 A1 | | 3/2005 | Holcomb | |
| 2005/0220190 A1 | | 10/2005 | Ha et al. | |
| 2006/0062303 A1 | | 3/2006 | Xu | |

FOREIGN PATENT DOCUMENTS

EP 520765 12/1992

(Continued)

OTHER PUBLICATIONS

Further Search Report from corresponding GB Application No. 0802203, dated Oct. 12, 2009.

*Primary Examiner* — Huy T Nguyen
(74) *Attorney, Agent, or Firm* — Lerner, David, Littenberg, Krumholz & Mentlik, LLP

(57) ABSTRACT

A recording and playback apparatus includes a first obtaining unit configured to obtain one or more moving parameters regarding motion from a first image; a converter configured to convert the first image into a second image composed of a lesser amount of data than the first image; a recording controller configured to record moving parameter information and the second image on a recording medium, the moving parameter information relating to the moving parameters of the first image; a reading controller configured to read the moving parameter information and the second image from the recording medium; and an image processor configured to execute image processing on the second image read from the recording medium using the moving parameters of the first image, the moving parameters of the first image being obtained from the moving parameter information read from the recording medium.

20 Claims, 19 Drawing Sheets

FOREIGN PATENT DOCUMENTS

| | | |
|---|---|---|
| EP | 940774 | 9/1999 |
| EP | 1085762 A2 | 3/2001 |
| EP | 1568233 | 8/2005 |
| EP | 1574995 | 9/2005 |
| EP | 1659797 | 5/2006 |
| EP | 1932363 | 6/2008 |
| GB | 2 248 361 | 4/1992 |
| GB | 2264415 | 8/1993 |
| GB | 2406456 | 3/2005 |
| JP | 08-149480 A | 6/1996 |
| WO | 2006-025339 A1 | 3/2006 |

* cited by examiner

FIG. 9

| FRAME NUMBER | POSITION | MOVING VECTOR | PREDICTED POSITION | MOVING VECTOR OF DECIMATED IMAGE | PREDICTED POSITION OF DECIMATED IMAGE | PREDICTED INTER-POLATION POSITION OF DECIMATED IMAGE | INTERPOLATION ERROR |
|---|---|---|---|---|---|---|---|
| 1 | 0 | — | 0 | 0 | 0 | 0 | 0 |
| 2 | 1 | 1 | 1 | | | 1 | 0 |
| 3 | 2 | 1 | 2 | 2 | 2 | 2 | 0 |
| 4 | 3 | 1 | 3 | | | 3 | 0 |
| 5 | 4 | 1 | 4 | 2 | 4 | 4 | 0 |
| 6 | 5 | 1 | 5 | | | 3.5 | −1.5 |
| 7 | 3 | −2 | 3 | −1 | 3 | 3 | 0 |
| 8 | 1 | −2 | 1 | | | 1 | 0 |
| 9 | −1 | −2 | −1 | −4 | −1 | −1 | 0 |
| 10 | −3 | −2 | −3 | | | −3 | 0 |
| 11 | −5 | −2 | −5 | −4 | −5 | −5 | 0 |

RECORDING AND PLAYBACK APPARATUS AND RECORDING AND PLAYBACK METHOD, RECORDING APPARATUS AND RECORDING METHOD, PLAYBACK APPARATUS AND PLAYBACK METHOD, AND PROGRAM

CROSS-REFERENCE TO RELATED APPLICATIONS

The present application claims priority from Japanese Patent Application No. JP 2005-322405 filed on Nov. 7, 2005, the disclosure of which is hereby incorporated by reference herein.

BACKGROUND OF THE INVENTION

1. Field of the Invention

The present invention relates to recording and playback apparatuses and recording and playback methods, recording apparatuses and recording methods, playback apparatuses and playback methods, and programs. More specifically, the present invention relates to, for example, a recording and playback apparatus and recording and playback method, a recording apparatus and recording method, a playback apparatus and playback method, and a program with which highly accurate moving parameters are obtained in advance so that the moving parameters can be used for various types of image processing.

2. Description of the Related Art

In a recording and playback apparatus, such as a hard disk recorder, that records, for example, an image and plays back the recorded image, in some cases, processing is executed on the image to be recorded in order to save the recording capacity of a hard disk.

More specifically, for example, the amount of data of the image is reduced by decimating the frames of the image to be recorded or decimating the pixels of each frame of the image. When the image is played back, moving parameters regarding motion, such as a moving vector, are obtained from the image composed of the reduced amount of data, and the moving parameters are used for image processing, such as noise reduction.

The method of obtaining a moving vector, which is a moving parameter of an image, is described, for example, in Japanese Unexamined Patent Application Publication No. 8-149480.

When moving parameters are obtained from an image composed of a relatively small amount of data, compared with a case where moving parameters are obtained from an image composed of a relatively large amount of data, the accuracy of moving parameters is degraded, so that appropriate processing might be inhibited in subsequent image processing.

It is desired that highly accurate moving parameters can be used for image processing.

SUMMARY OF THE INVENTION

According to a first embodiment of the present invention, there is provided a recording and playback apparatus for recording an image on a recording medium and playing back the image from the recording medium. The recording and playback apparatus includes first obtaining means for obtaining one or more moving parameters regarding motion from a first image; converting means for converting the first image into a second image composed of a lesser amount of data than the first image; recording controlling means for recording moving parameter information and the second image on the recording medium, the moving parameter information relating to the moving parameters of the first image; reading controlling means for reading the moving parameter information and the second image from the recording medium; and image processing means for executing image processing on the second image read from the recording medium using the moving parameters of the first image, the moving parameters of the first image being obtained from the moving parameter information read from the recording medium.

The moving parameters obtained by the first obtaining means may include one or more parameters selected from the group consisting of a moving vector, a level change representing a degree of change in luminance or color signal, a zoom ratio representing a degree of enlargement or reduction, a rotation rate representing a degree of rotation, a frequency band change representing a degree of change in frequency band, and a focus change representing a degree of change in focus.

The converting means may convert the first image into the second image by decimating frames of the first image or decimating pixels of each frame of the first image.

The image processing means may execute, as the image processing, one or more of frame interpolation, up-conversion, Y/C separation, noise reduction, object extraction, and I/P (Interlace/Progressive) conversion.

The recording and playback apparatus according to the first embodiment may further include second obtaining means for obtaining one or more moving parameters from the second image; difference information obtaining means for obtaining difference information regarding one or more differences between the moving parameters of the first image and the moving parameters of the second image; and reconstructing means for reconstructing the moving parameters of the first image. In this case, the recording controlling means can record the difference information on the recording medium, and the reconstructing means can reconstruct the moving parameters of the first image from the difference information and the moving parameters of the second image, the difference information being read from the recording medium, and the moving parameters of the second image being obtained from the second image read from the recording medium.

When image processing means for executing image processing in a playback apparatus for playing back an image executes image processing on the second image read from the recording medium, the difference information obtaining means may obtain the difference information regarding only one or more moving parameters used for the image processing executed by the image processing means from among the moving parameters of the first image.

The recording and playback apparatus according to the first embodiment may further include compressing means for compressing the second image into compressed data using the moving parameters obtained by the second obtaining means; and decompressing means for decompressing the compressed data into the second image. In this case, the recording controlling means can record the compressed data of the second image and the difference information on the recording medium, and the reading controlling means can read the compressed data and the difference information from the recording medium.

Also, the recording and playback apparatus according to the first embodiment may further include compressing means for compressing the second image into compressed data using the moving parameters obtained by the first obtaining means; decompressing means for decompressing the compressed data into the second image; and third obtaining means for obtaining one or more moving parameters from the second image decompressed by the decompressing means. In this case, the recording controlling means can record the compressed data of the second image and the difference information on the recording medium, the reading controlling means can read the compressed data and the difference information from the recording medium, and the reconstructing means can reconstruct the moving parameters of the first image from the difference information and the moving parameters of the second image, the moving parameters of the second image being obtained by the third obtaining means.

Also, according to the first embodiment of the present invention, there is provided a recording and playback method of a recording and playback apparatus for recording an image on a recording medium and playing back the image from the recording medium, or a program for causing a computer to execute a recording and playback method for recording an image on a recording medium and playing back the image from the recording medium. The recording and playback method or the program includes obtaining one or more moving parameters regarding motion from a first image; converting the first image into a second image composed of a lesser amount of data than the first image; recording moving parameter information and the second image on the recording medium, the moving parameter information relating to the moving parameters of the first image; reading the moving parameter information and the second image from the recording medium; and executing image processing on the second image read from the recording medium using the moving parameters of the first image, the moving parameters of the first image being obtained from the moving parameter information read from the recording medium.

With the recording and playback apparatus, the recording and playback method, or the program according to the first embodiment described above, one or more moving parameters regarding motion are obtained from a first image, the first image is converted into a second image composed of a lesser amount of data than the first image, and moving parameter information and the second image are recorded on the recording medium, the moving parameter information relating to the moving parameters of the first image. Then, the moving parameter information and the second image are read from the recording medium, and image processing is executed on the second image read from the recording medium using the moving parameters of the first image, the moving parameters of the first image being obtained from the moving parameter information read from the recording medium.

According to a second embodiment of the present invention, there is provided a recording apparatus for recording an image on a recording medium. The recording apparatus includes first obtaining means for obtaining one or more moving parameters regarding motion from a first image; converting means for converting the first image into a second image composed of a lesser amount of data than the first image; and recording controlling means for recording moving parameter information and the second image on the recording medium, the moving parameter information relating to the moving parameters of the first image.

The recording apparatus according to the second embodiment may further include transmission controlling means for transmitting the moving parameter information and the second image recorded on the recording medium to another apparatus for playing back an image.

The moving parameters obtained by the first obtaining means may include one or more parameters selected from the group consisting of a moving vector, a level change representing a degree of change in luminance or color signal, a zoom ratio representing a degree of enlargement or reduction, a rotation rate representing a degree of rotation, a frequency band change representing a degree of change in frequency band, and a focus change representing a degree of change in focus.

The converting means may convert the first image into the second image by decimating frames of the first image or decimating pixels of each frame of the first image.

The recording apparatus according to the second embodiment may further include second obtaining means for obtaining one or more moving parameters from the second image; and difference information obtaining means for obtaining difference information regarding one or more differences between the moving parameters of the first image and the moving parameters of the second image. In this case, the recording controlling means can record the difference information on the recording medium.

When image processing means for executing image processing in a playback apparatus for playing back an image executes image processing on the second image read from the recording medium, the difference information obtaining means may obtain the difference information regarding only one or more moving parameters used for the image processing executed by the image processing means from among the moving parameters of the first image.

The recording apparatus according to the second embodiment may further include compressing means for compressing the second image into compressed data using the moving parameters obtained by the second obtaining means. In this case, the recording controlling means can record the compressed data of the second image and the difference information on the recording medium.

Also, the recording apparatus according to the second embodiment may further include compressing means for compressing the second image into compressed data using the moving parameters obtained by the first obtaining means. In this case, the recording controlling means can record the compressed data of the second image and the difference information on the recording medium.

Also, according to the second embodiment of the present invention, there is provided a recording method of a recording apparatus for recording an image on a recording medium, or a program for causing a computer to execute a recording method for recording an image on a recording medium, the recording method or the program including obtaining one or more moving parameters regarding motion from a first image; converting the first image into a second image composed of a lesser amount of data than the first image; and recording moving parameter information and the second image on the recording medium, the moving parameter information relating to the moving parameters of the first image.

With the recording apparatus, the recording method, or the program according to the second embodiment described above, one or more moving parameters regarding motion are obtained from a first image, and the first image is converted into a second image composed of a lesser amount of data than the first image. Then, moving parameter information and the second image are recorded on the recording medium, the moving parameter information relating to the moving parameters of the first image.

According to a third embodiment of the present invention, there is provided a playback apparatus for playing back an image. The playback apparatus includes reading controlling means for reading moving parameter information and a second image from a recording medium, the moving parameter information relating to one or more moving parameters of a first image, and the second image being obtained by reducing the amount of data of the first image; and image processing means for executing image processing on the second image read from the recording medium using the moving parameters of the first image, the moving parameters of the first image being obtained from the moving parameter information read from the recording medium.

The playback apparatus according to the third embodiment may further include reception controlling means for receiving the moving parameter information and the second image transmitted from another apparatus. In this case, the moving parameter information and the second image received by the reception controlling means can be recorded on the recording medium.

The image processing means may execute, as the image processing, one or more of frame interpolation, up-conversion, Y/C separation, noise reduction, object extraction, and I/P conversion.

The playback apparatus according to the third embodiment may further include reconstructing means for reconstructing the moving parameters of the first image. In this case, when difference information regarding one or more differences between the moving parameters of the first image and one or more moving parameters of the second image is recorded on the recording medium, the reconstructing means can reconstruct the moving parameters of the first image from the difference information and the moving parameters of the second image, the difference information being read from the recording medium, and the moving parameters of the second image being obtained from the second image read from the recording medium.

The playback apparatus according to the third embodiment may further include decompressing means for decompressing compressed data of the second image into the second image, the compressed data of the second image being obtained by compressing the second image using the moving parameters of the second image and being recorded on the recording medium.

The playback apparatus according to the third embodiment may further include decompressing means for decompressing compressed data of the second image into the second image, the compressed data of the second image being obtained by compressing the second image using the moving parameters of the first image and being recorded on the recording medium; and obtaining means for obtaining one or more moving parameters from the second image decompressed by the decompressing means. In this case, the reconstructing means can reconstruct the moving parameters of the first image from the difference information and the moving parameters of the second image, the moving parameters of the second image being obtained by the obtaining means.

Also, according to the third embodiment of the present invention, there is provided a playback method of a playback apparatus for playing back an image, or a program for causing a computer to execute a playback method for playing back an image, the playback method or the program including reading a second image and moving parameter information from a recording medium, the moving parameter information relating to one or more moving parameters of a first image, and the second image being obtained by reducing the amount of data of the first image; and executing image processing on the second image read from the recording medium using the moving parameters of the first image, the moving parameters of the first image being obtained from the moving parameter information read from the recording medium.

With the playback apparatus, the playback method, or the program according to the third embodiment described above, a second image and moving parameter information are read from a recording medium, the moving parameter information relating to one or more moving parameters of a first image, and the second image being obtained by reducing the amount of data of the first image. Then, image processing is executed on the second image read from the recording medium using the moving parameters of the first image, the moving parameters of the first image being obtained from the moving parameter information read from the recording medium.

According to these embodiments of the present invention, it is possible to use highly accurate moving parameters for image processing.

BRIEF DESCRIPTION OF THE DRAWINGS

FIG. 9 is a third diagram for explaining an example of processing executed in the MPd difference information obtaining unit shown in FIG. 6;

DETAILED DESCRIPTION

Figure 1:
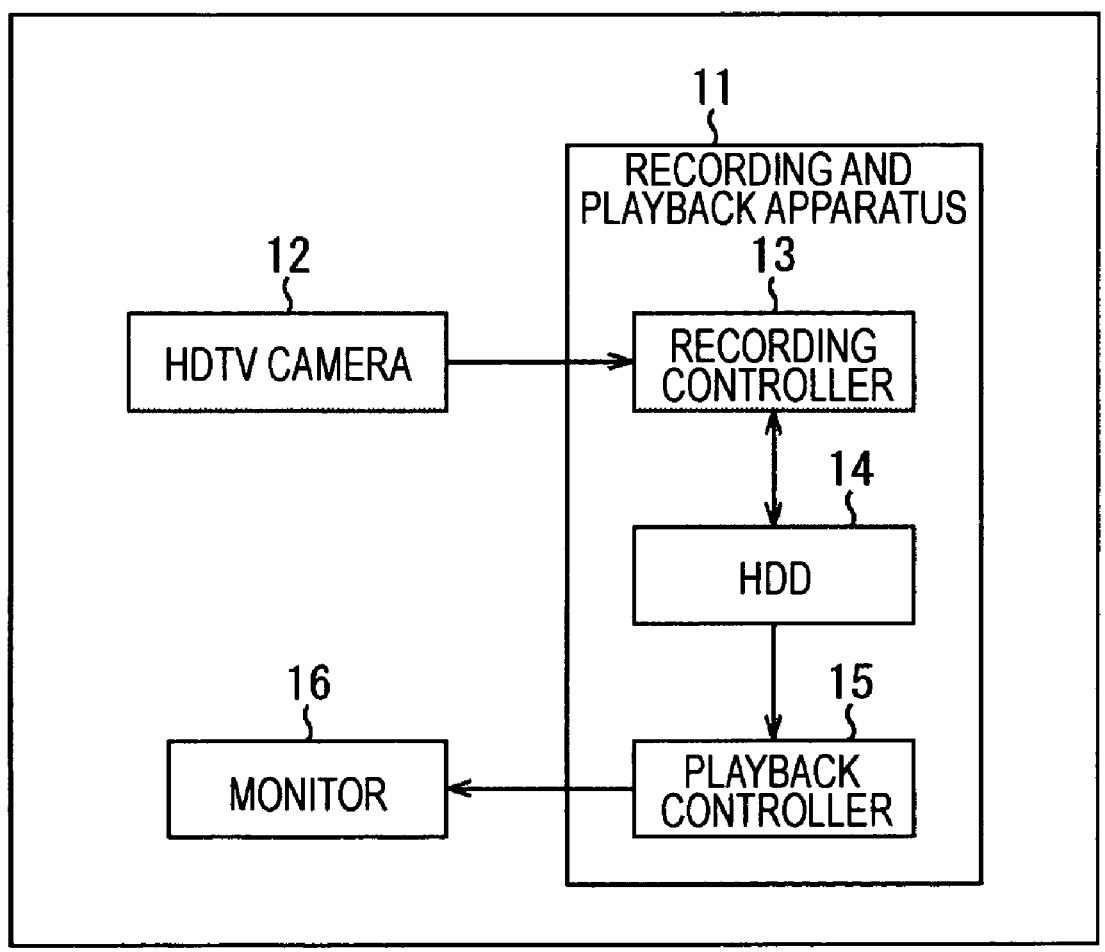
FIG. 1 is a block diagram showing an example configuration of a recording and playback system according to an embodiment of the present invention.

Now, embodiments of the present invention will be described. The correspondence between the features of the present invention and the embodiments described in this specification or shown in the drawings is, for example, as follows. This description is intended to assure that embodiments supporting the present invention are described in this specification or shown in the drawings. Thus, even if an embodiment described in this specification or shown in the drawings is not described or shown herein as corresponding to certain features of the present invention, that does not mean that the embodiment does not correspond to those features. Conversely, even if an embodiment is described or shown herein as corresponding to certain features, that does not mean that the embodiment does not correspond to other features.

A recording and playback apparatus (e.g., a recording and playback apparatus 11 shown in FIG. 1) according to a first embodiment of the present invention is a recording and playback apparatus for recording an image on a recording medium (e.g., an HDD 14 shown in FIG. 1) and playing back the image from the recording medium. The recording and playback apparatus includes first obtaining means (e.g., an MP1 obtaining unit 22 shown in FIG. 2) for obtaining one or more moving parameters regarding motion from a first image; converting means (e.g., a decimator 23 shown in FIG. 2) for converting the first image into a second image composed of a less amount of data than the first image; recording controlling means (e.g., an input/output interface 21 shown in FIG. 2) for recording moving parameter information and the second image on the recording medium, the moving parameter information relating to the moving parameters of the first image; reading controlling means (e.g., an input/output interface 41 shown in FIG. 4) for reading the moving parameter information and the second image from the recording medium; and image processing means (e.g., an image processor 43 shown in FIG. 4) for executing image processing on the second image read from the recording medium, using the moving parameters of the first image, the moving parameters of the first image being obtained from the moving parameter information read from the recording medium.

Figure 13:
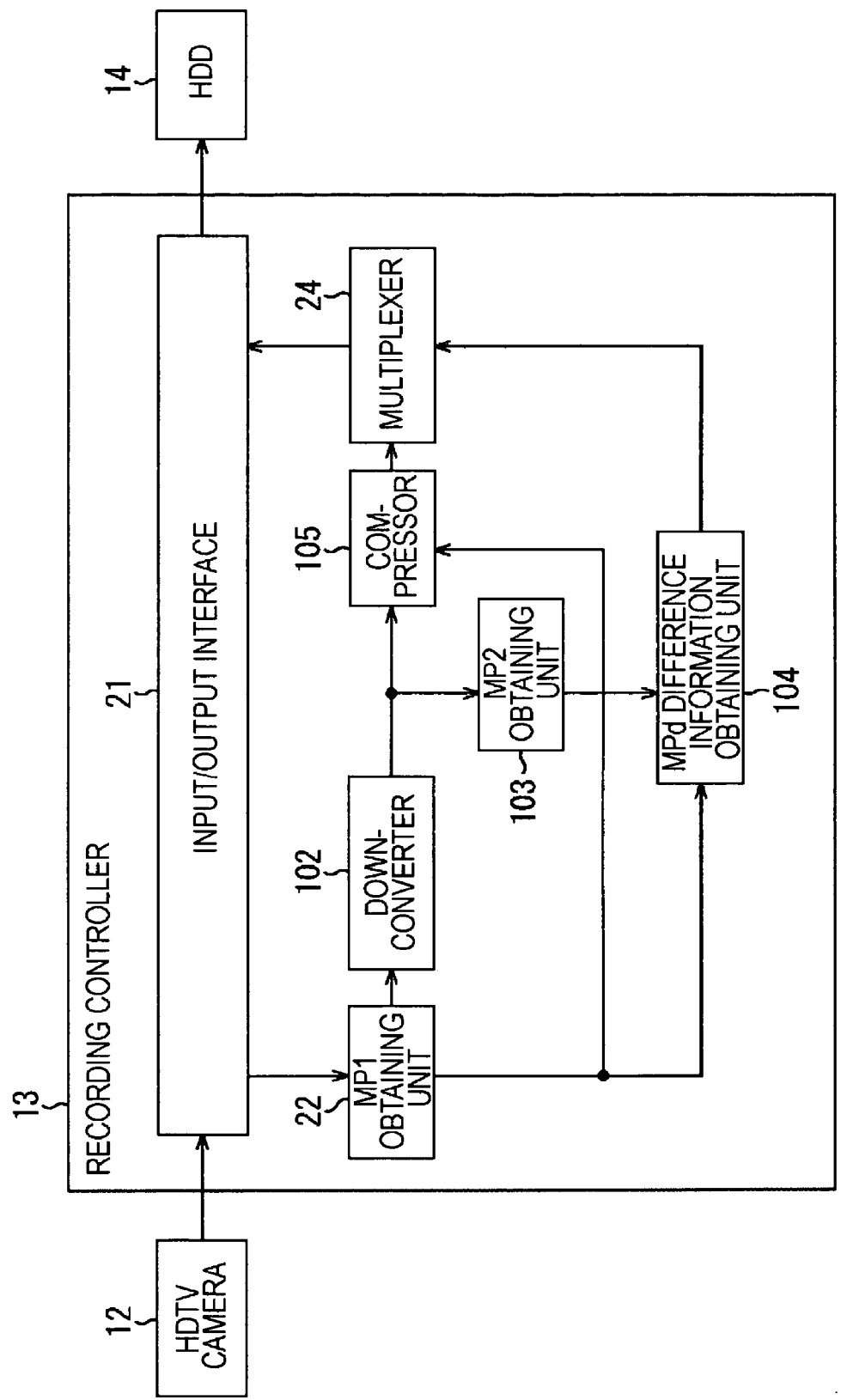
FIG. 13 is a block diagram showing yet another example configuration of the recording controller shown in FIG. 1.

The recording and playback apparatus according to the first embodiment may further include second obtaining means (e.g., an MP2 obtaining unit 103 shown in FIG. 13) for obtaining one or more moving parameters from the second image; difference information obtaining means (e.g., an MPd difference information obtaining unit 104 shown in FIG. 13) for obtaining difference information regarding one or more differences between the moving parameters of the first image and the moving parameters of the second image; and reconstructing means (e.g., an MP1 reconstructor 125 shown in FIG. 16) for reconstructing the moving parameters of the first image. In this case, the recording controlling means can record the difference information on the recording medium as the moving parameter information, and the reconstructing means can reconstruct the moving parameters of the first image from the difference information and the moving parameters of the second image, the difference information being read from the recording medium as the moving parameter information, and the moving parameters of the second image being obtained from the second image read from the recording medium.

The recording and playback apparatus according to the first embodiment may further include compressing means (e.g., a compressor 55 shown in FIG. 6) for compressing the second image into compressed data using the moving parameters obtained by the second obtaining means; and decompressing means (e.g., a decompressor 83 shown in FIG. 11) for decompressing the compressed data into the second image. In this case, the recording controlling means can record the compressed data of the second image and the difference information on the recording medium, and the reading controlling means can read the compressed data and the difference information from the recording medium.

Also, the recording and playback apparatus according to the first embodiment may further include compressing means (e.g., a compressor 105 shown in FIG. 13) for compressing the second image into compressed data using the moving parameters obtained by the first obtaining means; decompressing means (e.g., a decompressor 123 shown in FIG. 16) for decompressing the compressed data into the second image; and third obtaining means (e.g., an MP2 obtaining unit 124 shown in FIG. 16) for obtaining one or more moving parameters from the second image decompressed by the decompressing means. In this case, the recording controlling means can record the compressed data of the second image and the difference information on the recording medium, the reading controlling means can read the compressed data and the difference information from the recording medium, and the reconstructing means can reconstruct the moving parameters of the first image using the difference information and the moving parameters of the second image, the moving parameters of the second image being obtained by the third obtaining means.

A recording and playback method or a program according to the first embodiment of the present invention is a recording and playback method of a recording and playback apparatus for recording an image on a recording medium and playing back the image from the recording medium, or a program for allowing a computer to execute recording and playback processing for recording an image on a recording medium and playing back the image from the recording medium. The recording and playback method or the program includes the steps of obtaining one or more moving parameters regarding motion from a first image (e.g., step S11 shown in FIG. 3); converting the first image into a second image composed of a less amount of data than the first image (e.g., step S12 shown in FIG. 3); recording moving parameter information and the second image on the recording medium, the moving parameter information relating to the moving parameters of the first image (e.g., step S14 shown in FIG. 3); reading the moving parameter information and the second image from the recording medium (e.g., step S21 shown in FIG. 5); and executing image processing on the second image read from the recording medium, using the moving parameters of the first image, the moving parameters of the first image being obtained from the moving parameter information read from the recording medium (e.g., step S23 shown in FIG. 5).

Figure 18:
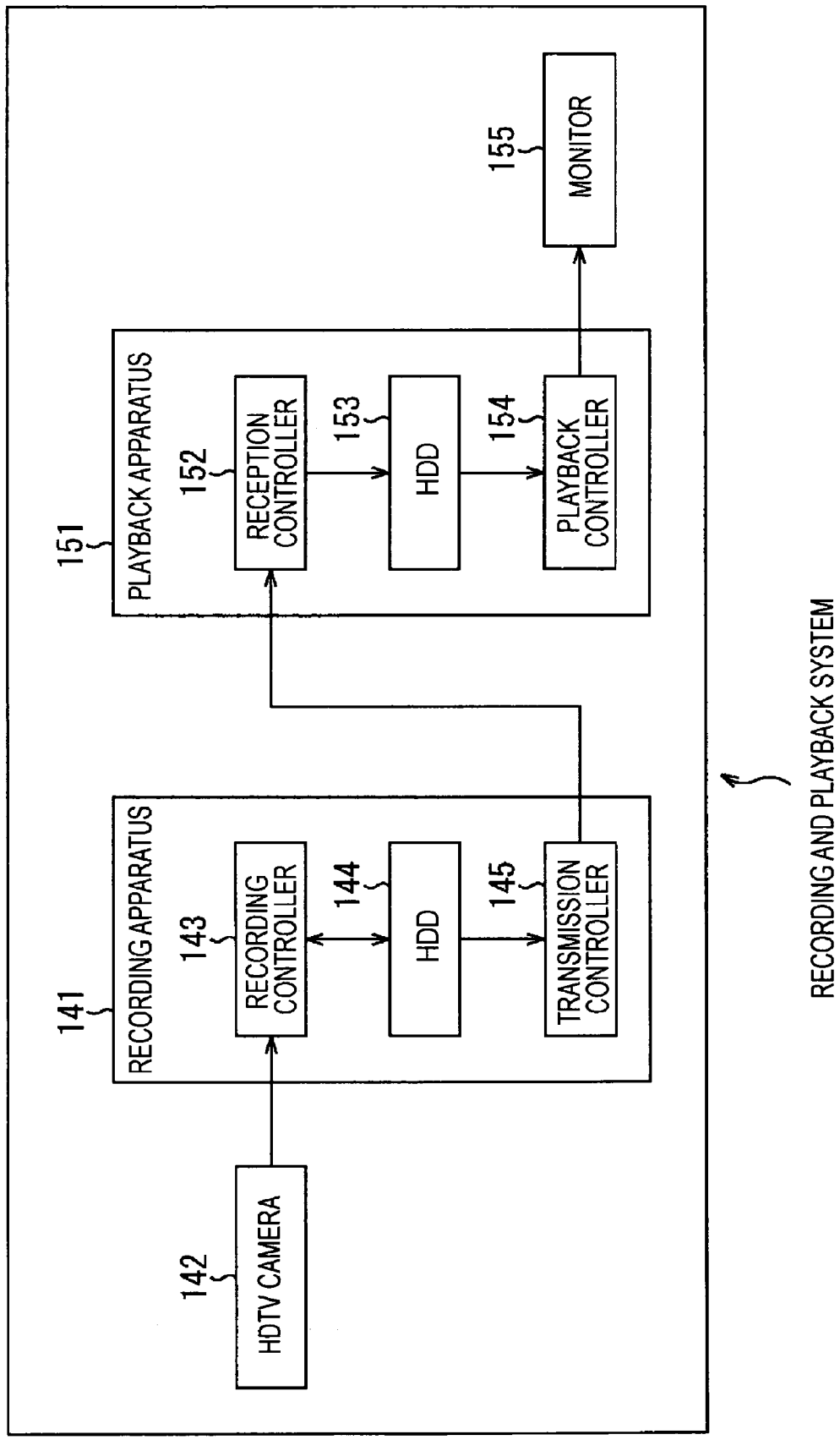
FIG. 18 is a block diagram showing an example configuration of a recording and playback system according to another embodiment of the present invention.

A recording apparatus (e.g., a recording apparatus 141 shown in FIG. 18) according to a second embodiment of the present invention is a recording apparatus for recording an image on a recording medium (e.g., an HDD 144 shown in FIG. 18). The recording apparatus includes first obtaining means (e.g., the MP1 obtaining unit 22 shown in FIG. 2) for obtaining one or more moving parameters regarding motion from a first image; converting means (e.g., the decimator 23 shown in FIG. 2) for converting the first image into a second image composed of a less amount of data than the first image; and recording controlling means (e.g., the input/output interface 21 shown in FIG. 2) for recording moving parameter information and the second image on the recording medium, the moving parameter information relating to the moving parameters of the first image.

The recording apparatus according the second embodiment may further include transmission controlling means (e.g., a transmission controller 145 shown in FIG. 18) for transmitting the moving parameter information and the second image recorded on the recording medium to another apparatus (e.g., a playback apparatus 151 shown in FIG. 18) for playing back an image.

The recording apparatus according to the second embodiment of the present invention may further include second obtaining means (e.g., the MP2 obtaining unit 103 shown in FIG. 13) for obtaining one or more moving parameters from the second image; and difference information obtaining means (e.g., the MPd difference information obtaining unit 104 shown in FIG. 13) for obtaining difference information regarding one or more differences between the moving parameters of the first image and the moving parameters of the second image. In this case, the recording controlling means can record the difference information on the recording medium as the moving parameter information.

The recording apparatus according to the second embodiment of the present invention may further include compressing means (e.g., the compressor 55 shown in FIG. 6) for compressing the second image into compressed data using the moving parameters obtained by the second obtaining means. In this case, the recording controlling means can record the compressed data of the second image and the difference information on the recording medium.

Also, the recording apparatus according to the second embodiment of the present invention may further include compressing means (e.g., the compressor 105 shown in FIG. 13) for compressing the second image into compressed data using the moving parameters obtained by the first obtaining means. In this case, the recording controlling means can record the compressed data of the second image and the difference information on the recording medium.

A recording method or a program according to the second embodiment of the present invention is a recording method of a recording apparatus for recording an image on a recording medium, or a program for allowing a computer to execute recording processing for recording an image on a recording medium. The recording method or the program includes the steps of obtaining one or more moving parameters regarding motion from a first image (e.g., step S11 shown in FIG. 3); converting the first image into a second image composed of a less amount of data than the first image (e.g., step S12 shown in FIG. 3); and recording moving parameter information and the second image on the recording medium, the moving parameter information relating to the moving parameters of the first image (e.g., step S14 shown in FIG. 3).

A playback apparatus (e.g., the playback apparatus 151 shown in FIG. 18) according to a third embodiment of the present invention is a playback apparatus for playing back an image. The playback apparatus includes reading controlling means (e.g., the input/output interface 41 shown in FIG. 4) for reading moving parameter information and a second image from a recording medium (e.g., an HDD 153 shown in FIG. 18) having recorded the moving parameter information and the second image thereon, the moving parameter information relating to one or more moving parameters of a first image, and the second image being obtained by reducing the amount of data of the first image; and image processing means (e.g., the image processor 43 shown in FIG. 4) for executing image processing on the second image read from the recording medium, using the moving parameters of the first image, the moving parameters of the first image being obtained from the moving parameter information read from the recording medium.

The playback apparatus according to the third embodiment of the present invention may further include reception controlling means (e.g., a reception controller 152 shown in FIG. 18) for receiving the moving parameter information and the second image transmitted from another apparatus (e.g., the recording apparatus 141 shown in FIG. 18). In this case, the moving parameter information and the second image received by the reception controlling means can be recorded on the recording medium.

The playback apparatus according to the third embodiment of the present invention may further include reconstructing means (e.g., the MP1 reconstructor 84 shown in FIG. 11) for reconstructing the moving parameters of the first image. In this case, when difference information regarding one or more differences between the moving parameters of the first image and one or more moving parameters of the second image is recorded on the recording medium as the moving parameter information, the reconstructing means can reconstruct the moving parameters of the first image from the difference information and the moving parameters of the second image, the difference information being read from the recording medium as the moving parameter information, and the moving parameters of the second image being obtained from the second image read from the recording medium.

The playback apparatus according to the third embodiment of the present invention may further include decompressing means (e.g., the decompressor 83 shown in FIG. 11) for decompressing compressed data of the second image into the second image, the compressed data of the second image being obtained by compressing the second image using the moving parameters of the second image and being recorded on the recording medium.

The playback apparatus according to the third embodiment may further include decompressing means (e.g., the decompressor 123 shown in FIG. 16) for decompressing compressed data of the second image into the second image, the compressed data being obtained by compressing the second image using the moving parameters of the first image and being recorded on the recording medium; and obtaining means (e.g., the MP2 obtaining unit 124 shown in FIG. 16) for obtaining one or more moving parameters from the second image decompressed by the decompressing means. In this case, the reconstructing means can reconstruct the moving parameters of the first image using the difference information and the moving parameters of the second image, the moving parameters of the second image being obtained by the obtaining means.

Figure 5:
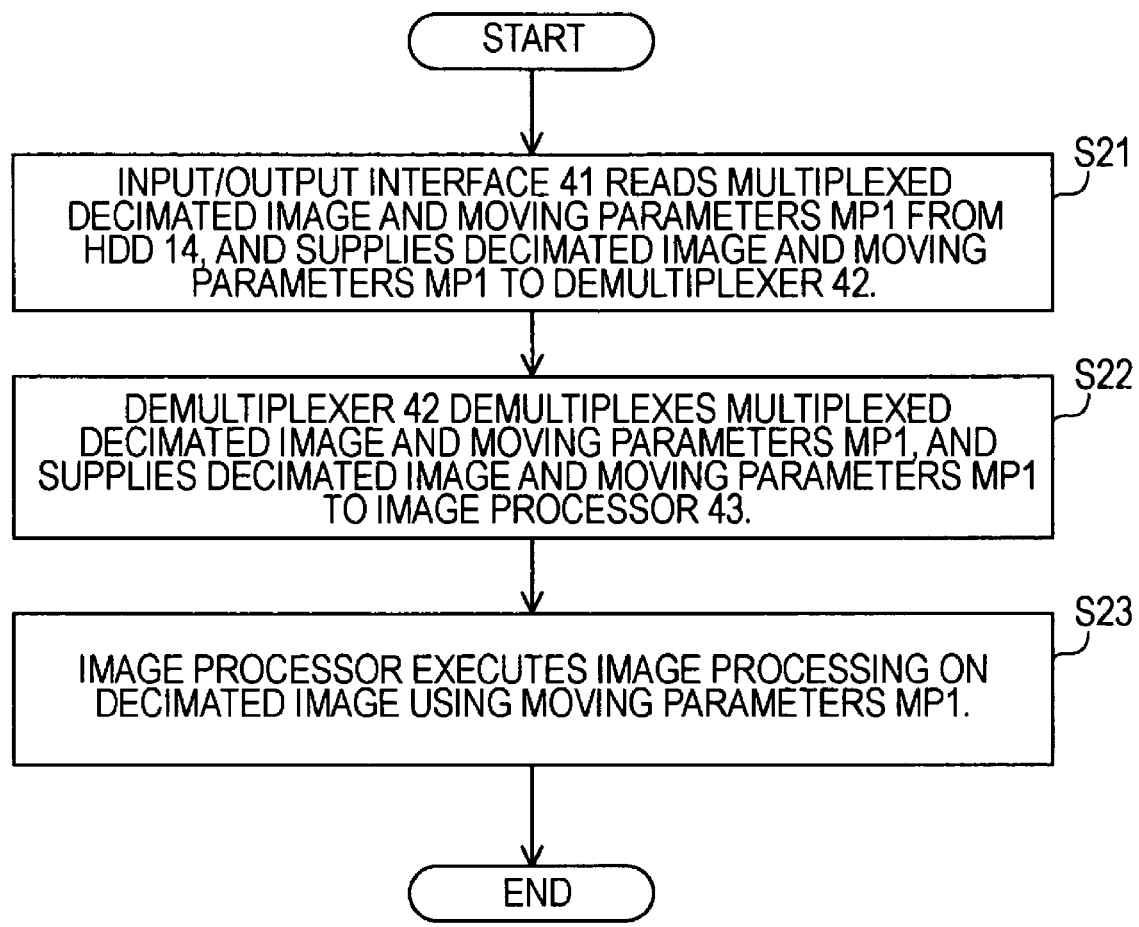
FIG. 5 is a flowchart showing processing executed in the playback controller shown in FIG. 4.

A playback method or a program according to the third embodiment of the present invention is a playback method of a playback apparatus for playing back an image, or a program for allowing a computer to execute playback processing for playing back an image, the playback method or the program including the steps of reading a second image and moving parameter information from a recording medium having the second image and the moving parameter information recorded thereon, the moving parameter information relating to one or more moving parameters of a first image, and the second image being obtained by reducing the amount of data of the first image (e.g., step S21 shown in FIG. 5); and executing image processing on the second image read from the recording medium, using the moving parameters of the first image, the moving parameters of the first image being obtained from the moving parameter information read from the recording medium (e.g., step S23 shown in FIG. 5).

Now, embodiments of the present invention will be described with reference to the drawings.

FIG. 1 is a block diagram showing an example configuration of a recording and playback system according to an embodiment of the present invention.

The recording and playback system includes a recording and playback apparatus 11, an HDTV (High Definition Television) camera 12, and a monitor 16. The recording and playback apparatus 11 includes a recording controller 13, an HDD (Hard Disk Drive) 14, and a playback controller 15. The recording and playback apparatus 11 can be applied to a hard disk recorder, a file server connected to what is called a home network, or the like.

The HDTV camera 12 captures an HD (high definition) image composed of HDTV signals, and supplies the HD image to the recording controller 13.

The recording controller 13 supplies the HD image, supplied from the HDTV camera 12, to the HDD 14 so that the HD image is recorded on the HDD 14. Also, the recording controller 13 reads the HD image recorded on the HDD 14 and executes processing to obtain moving parameters regarding motion in the HD image, and converts the HD image into an image composed of a less amount of data than the HD image. Then, the recording controller 13 supplies the image composed of the less amount of data and moving parameter information regarding the moving parameters to the HDD 14 so that the image and the moving parameter information are recorded on the HDD 14.

As the moving parameters, one or more parameters among, for example, a moving vector, a level change representing a degree of change in luminance or color signal, a zoom ratio representing a degree of enlargement or reduction, a rotation rate representing a degree of rotation, a frequency band change representing a degree of change in frequency band, and a focus change representing a degree of change in focus can be used.

Alternatively, the recording controller 13 may execute processing for obtaining moving parameter information directly from the HD image supplied from the HDTV camera 12 without temporarily storing the HD image supplied from the HDTV camera 12 on the HDD 14, then convert the HD image supplied from the HDTV camera 12 into an image composed of a less amount of data than the HD image, and record the image composed of the less amount of data and the moving parameter information on the HDD 14.

The HDD 14 records the image composed of the less amount of data and the moving parameter information, supplied from the recording controller 13, on an internal hard disk. As a recording medium for recording the image composed of the less amount of image and the moving parameter information, alternatively, a disk recording medium other than a hard disk, a semiconductor memory, or the like may be used.

The playback controller 15 reads the image composed of the less amount of data and the moving parameter information from the HDD 14, and executes image processing on the image composed of the less amount of data using moving parameters obtained from the moving parameter information. Furthermore, the playback controller 15 supplies an image obtained through the image processing to the monitor 16.

The one or more parameters obtained from the moving parameter information may be used either for only one type of image processing or commonly for a plurality of types of image processing. For example, a moving vector, a luminance change representing a degree of change in luminance, or the like, which is a moving parameter obtained from the moving parameter information, can be used commonly for image processing such as noise reduction and up-conversion.

Examples of image processing executed using moving parameters include frame interpolation, up-conversion, Y/C separation, noise reduction, object extraction, and I/P (Interlace/Progressive) conversion.

The monitor 16 displays the image supplied from the playback controller 15.

Figure 2:
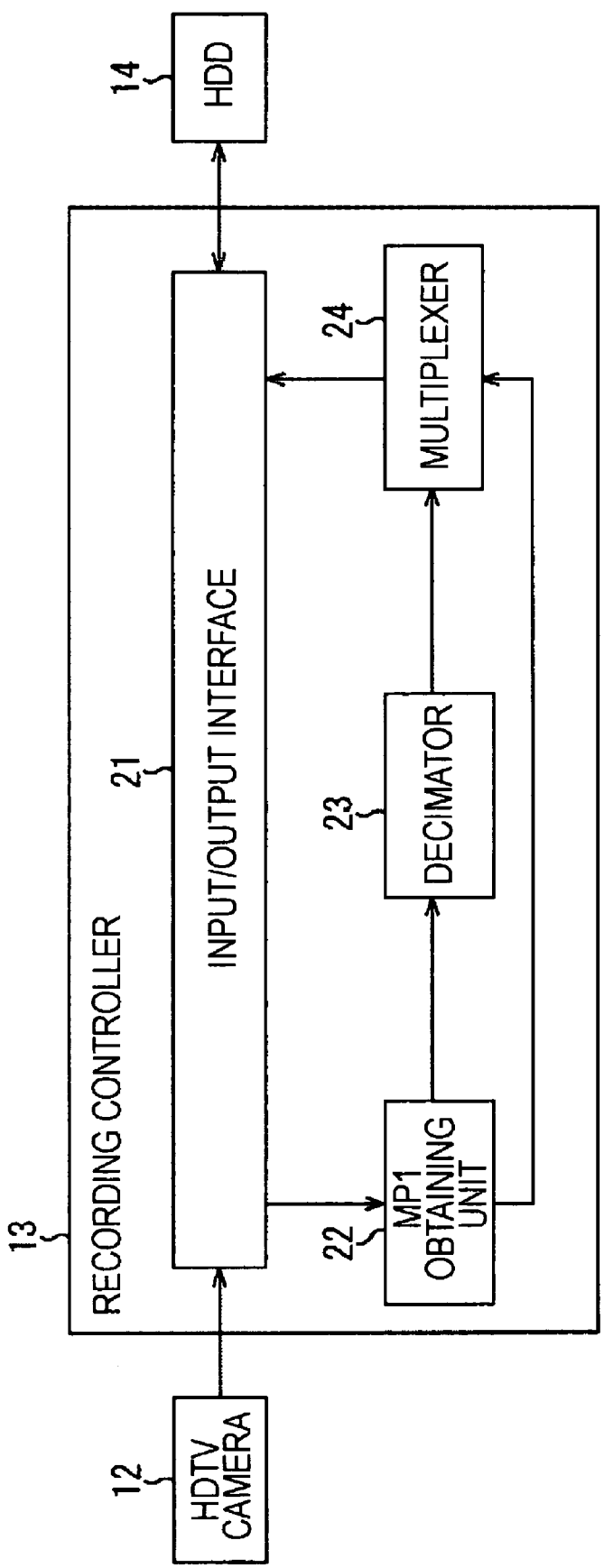
FIG. 2 is a block diagram showing an example configuration of a recording controller shown in FIG. 1.

FIG. 2 is a block diagram showing an example configuration of the recording controller 13 shown in FIG. 1.

An input/output interface 21 receives an HD image supplied from the HDTV camera 12, and supplies the HD image to an MP (Moving Parameter) 1 obtaining unit 22 or the HDD 14. Also, the input/output interface 21 reads the HD image from the HDD 14 and supplies the HD image to the MP1 obtaining unit 22. Furthermore, the input/output interface 21 receives an image and moving parameter information supplied from a multiplexer 24, and supplies the image and the moving parameter information to the HDD 14 so that the image and the moving parameter information are recorded on the HDD 14.

In order to obtain highly accurate moving parameters, the MP1 obtaining unit 22 detects (calculates) and thereby obtains moving parameters MP1, such as a moving vector, from the HD image having a high frame rate and a high definition, supplied from the HDD 14 via the input/output interface 21, and supplies the moving parameters MP1 to the multiplexer 24. Since the MP1 obtaining unit 22 detects the moving parameters MP1 using an HD image already recorded on the HDD 14, it is possible to obtain highly accurate moving parameters MP1 using, for example, a large number of frames.

More specifically, for example, regarding the moving vector among the moving parameters MP1, in the case of image processing based on the MPEG (Moving Picture Expert Group) standard, a moving vector is detected by executing processing using two or three frames. In contrast, since the MP1 obtaining unit 22 detects a moving vector from an HD image already recorded on the HDD 14, a sufficient time is available compared with a case where a moving vector is detected in real time. Thus, it is possible to detect a moving vector using four or more frames. This serves to predict the tendency of motion more accurately and to thereby obtain a highly accurate moving vector.

In addition to obtaining the moving parameters MP1 from the HD image supplied from the HDD 14 via the input/output interface 21 as described above, the MP1 obtaining unit 22 supplies the HD image to a decimator 23.

The decimator 23 decimates the frames of the HD image supplied from the MP1 obtaining unit 22, or the pixels of each frame thereof, to convert the HD images into a decimated image composed of a less amount of data, and supplies the decimated image to the multiplexer 24.

More specifically, for example, the decimator 23 executes decimation to discard N−1 frames per n successive frames of the HD image, N being greater than or equal to two, thereby converting the HD image into a decimated image having a lower frame rate than the HD image. Alternatively, for example, the decimator 23 executes decimation to reduce M adjacent pixels of each frame among successive frames of the HD image to one pixel, M being greater than or equal to two, thereby converting the HD image into a decimated image having a lower resolution than the HD image.

Yet alternatively, the decimator 23 may decimate the frames of the HD image and also decimate the pixels of each frame, thereby converting the HD image into a decimated image composed of a less amount of data.

The multiplexer 24 multiplexes the moving parameters MP1 as moving parameter information, supplied from the MP1 obtaining unit 22, and the decimated image, supplied from the decimator 23, and supplies the resulting multiplexed data to the input/output interface 21.

The input/output interface 21 supplies the multiplexed data, obtained by multiplexing the moving parameter information and the decimated image in the multiplexer 24, to the HDD 14 so that the multiplexed data is recorded on the HDD 14.

The MP1 obtaining unit 22 may execute processing for obtaining the moving parameters MP1 directly from the HD image supplied from the HDTV camera 12 via the input/output interface 21 (instead of the HD image recorded on the HDD 14).

The multiplexer 24 may supply the moving parameters MP1 as moving parameter information, supplied from the MP1 obtaining unit 22, and the decimated image, supplied from the decimator 23, directly to the input/output interface 21.

In this case, for example, the input/output interface 21 records the non-multiplexed moving parameter information and the decimated image, supplied from the multiplexer 24, as separate files on the HDD 14.

Figure 3:
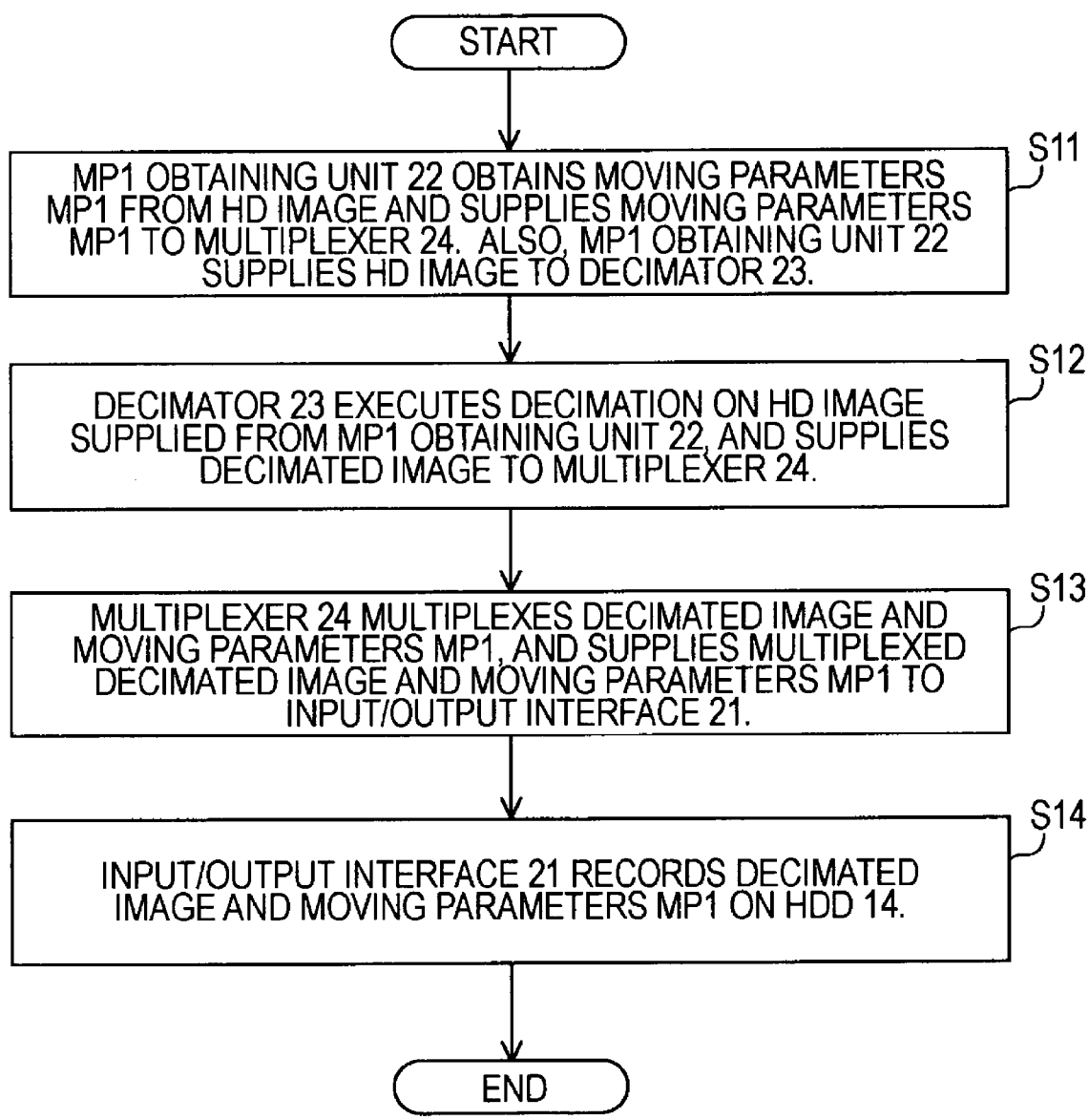
FIG. 3 is a flowchart showing processing executed in the recording controller shown in FIG. 2.

Next, processing executed in the recording controller 13 shown in FIG. 2 will be described with reference to a flowchart shown in FIG. 3.

When an HD image has been supplied to the recording controller 13, the recording controller 13 receives the HD images and supplies the HD image to the HDD 14 so that the HD image is recorded on the HDD 14. Then, the recording controller 13 executes processing according to the flowchart shown in FIG. 3, for example, when a user has performed an operation on an operating unit (not shown) or when (substantially) no processing that is to be executed exists.

More specifically, the input/output interface 21 reads an HD image from the HDD 14 and supplies the HD image to the MP1 obtaining unit 22. In step S11, the MP1 obtaining unit 22 obtains moving parameters MP1 from the HD image supplied from the input/output interface 21, and supplies the moving parameters MP1 to the multiplexer 24. Also, the MP1 obtaining unit 22 supplies the HD image, supplied from the input/output interface 21, to the decimator 23. The processing then proceeds to step S12.

In step S12, the decimator 23 decimates the frames of the HD image supplied from the MP1 obtaining unit 22 or the pixels of each frame thereof, thereby converting the HD image into a decimated image composed of a less amount of data, and supplies the decimated image to the multiplexer 24. The processing then proceeds to step S13.

In step S13, the multiplexer 24 multiplexes the moving parameters MP1 as moving parameter information, supplied from the MP1 obtaining unit 22, and the decimated image, supplied from the decimator 23, and supplies the resulting multiplexed data to the input/output interface 21. The processing then proceeds to step S14.

In step S14, the input/output interface 21 supplies the multiplexed data, supplied from the multiplexer 24, to the HDD 14. The processing is then ended.

Figure 4:
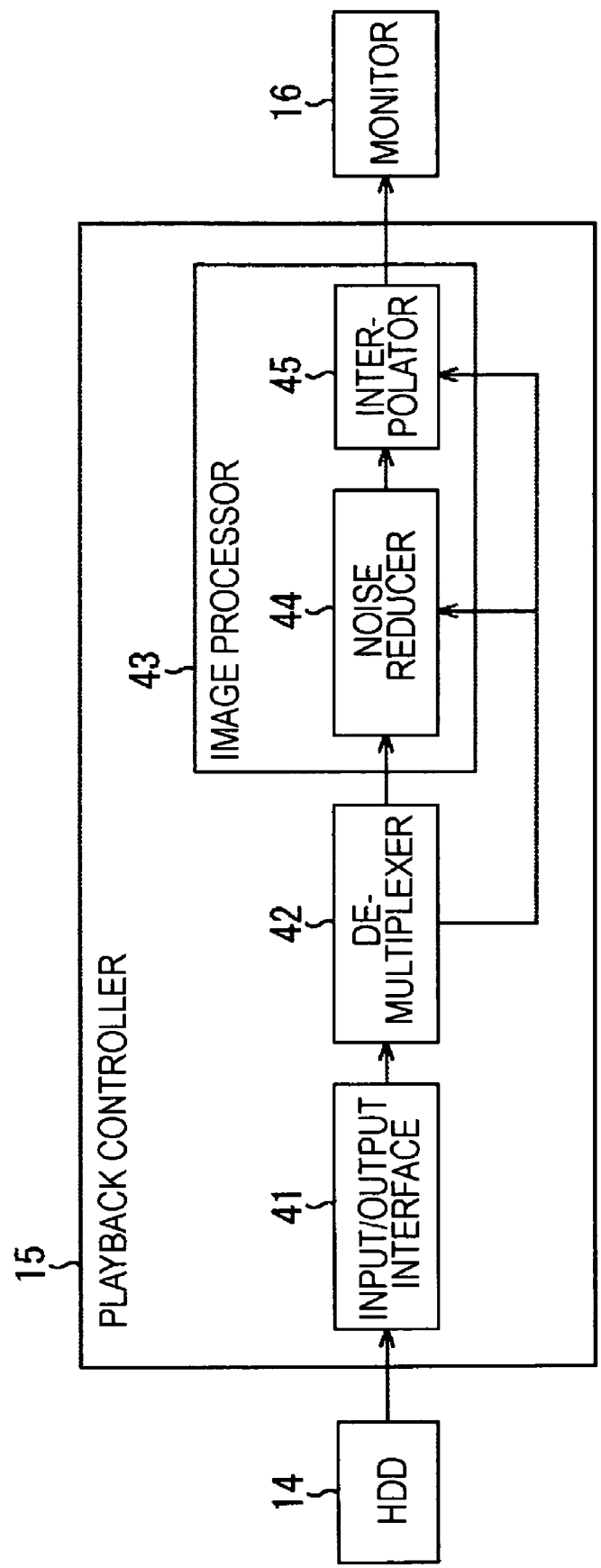
FIG. 4 is a block diagram showing an example configuration of a playback controller shown in FIG. 1.

FIG. 4 is a block diagram showing an example configuration of the playback controller 15 shown in FIG. 1.

An input/output interface 41 reads multiplexed data from the HDD 14 in response to a playback instruction, which is issued, for example, when a user has performed an operation on an operating unit (not shown), and supplies the multiplexed data to a demultiplexer 42.

The demultiplexer 42 demultiplexes the multiplexed data supplied from the input/output interface 41 into a decimated image and moving parameter information, and supplies the decimated image and the moving parameter information to an image processor 43.

The image processor 43 executes image processing on the decimated image supplied from the demultiplexer 42, using moving parameters MP1 of the HD image, i.e., the moving parameter information supplied from the demultiplexer 42, and supplies an image obtained through the image processing to the monitor 16. The image processor 43 can execute appropriate image processing on the decimated image by using the highly accurate moving parameters MP1 for image processing, the moving parameters MP1 having been obtained from a high quality (high frame rate and high definition) HD image.

More specifically, for example, the image processor 43 includes a noise reducer 44 and an interpolator 45. For each frame of the decimated image, the noise reducer 44 determines, using the highly accurate moving parameters MP1, whether the frame image is a moving image having an amount of motion greater than or equal to a certain amount or a still image having (substantially) no motion. Furthermore, when an image of a frame has been determined as a moving image, the noise reducer 44 executes noise reduction using only the image in the frame. On the other hand, when an image of a frame has been determined as a still image, the noise reducer 44 executes noise reduction using images of a plurality of preceding and succeeding frames including the subject frame. Furthermore, the noise reducer 44 supplies the decimated image after the noise reduction to the interpolator 45. The noise reducer 44 determines whether each frame image is a moving image or a still image using, for example, a moving vector or a luminance change representing a change in luminance among the moving parameters MP1.

The interpolator 45 executes interpolation of frames or interpolation of pixels in each frame on the decimated image supplied from the noise reducer 44, using, for example, a moving vector among the highly accurate moving parameters MP1 supplied from the demultiplexer 42, thereby converting the decimated image into a high quality HD image, and supplies the HD image to the monitor 16.

Next, processing executed in the playback controller 15 shown in FIG. 4 will be described with reference to a flowchart shown in FIG. 5.

When an image playback instruction is issued to the input/output interface 41, which is issued, for example, when a user has performed an operation on an operating unit (not shown), in step S21, the HDD 14 reads multiplexed data from the HDD 14 and supplies the multiplexed data to the demultiplexer 42. The processing then proceeds to step S22.

In step S22, the demultiplexer 42 demultiplexes the multiplexed data supplied from the input/output interface 41 into a decimated image and moving parameters MP1, and supplies the decimated image and the moving parameters MP1 to the image processor 43. The processing then proceeds to step S23.

In step S23, the image processor 43 executes image processing on the decimated image supplied from the demultiplexer 42, using the highly accurate moving parameters MP1, i.e., the moving parameters also supplied from the demultiplexer 42, and supplies the resulting image to the monitor 16. The processing is then ended.

More specifically, in the image processor 43, the noise reducer 44 executes noise reduction on the decimated image using the moving parameters MP1, and supplies the resulting decimated image to the interpolator 45. Using the moving parameters MP1, the interpolator 45 executes interpolation on the decimated image supplied from the noise reducer 44, thereby converting the decimated image into an HD image, and supplies the HD image to the monitor 16. The monitor 16 displays the HD image supplied from the interpolator 45 (the image processor 43).

Figure 6:
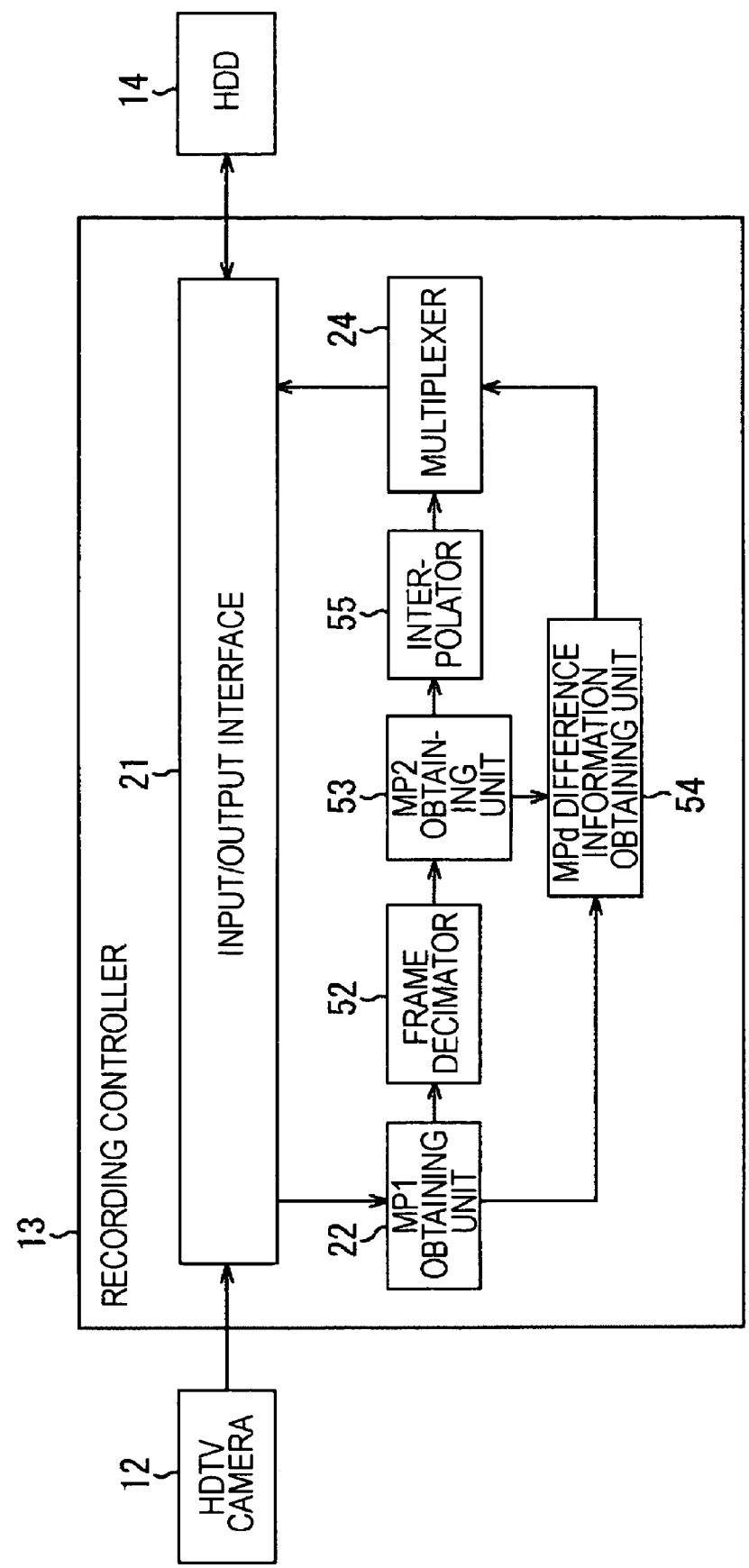
FIG. 6 is a block diagram showing another example configuration of the recording controller shown in FIG. 1.

FIG. 6 is a block diagram showing another example configuration of the recording controller 13 shown in FIG. 1. In FIG. 6, parts corresponding to those shown in FIG. 2 are designated by the same numerals, and description thereof will be omitted as appropriate.

The recording controller 13 shown in FIG. 6 includes a frame decimator 52 instead of the decimator 23, and newly includes an MP2 obtaining unit 53, an MPd difference information obtaining unit 54, and a compressor 55. The recording controller 13 shown in FIG. 6 is otherwise configured the same as that shown in FIG. 2.

The frame decimator 52 receives an HD image from the MP1 obtaining unit 22. The frame decimator 52 decimates the frames of the HD image supplied from the MP1 obtaining unit 22, thereby converting the HD image into a decimated image composed of a less amount of data, and supplies the decimated image to the MP2 obtaining unit 53.

The MP2 obtaining unit 53 detects (calculates) and thereby obtains moving parameters MP2 regarding a motion from the decimated image supplied from the frame decimator 52, such as a moving vector of the decimated image, and supplies the moving parameters MP2 to the MPd difference information obtaining unit 54. Furthermore, the MP2 obtaining unit 53 supplies the decimated image and the moving parameters MP2 to the compressor 55.

The MPd difference information obtaining unit 54 receives the moving parameters MP1 from the MP1 obtaining unit 22, and also receives the moving parameters MP2 from the MP2 obtaining unit 53. The MPd difference information obtaining unit 54 detects (calculates) and thereby obtains difference information MPd regarding one or more differences between the moving parameters MP1 supplied from the MP1 obtaining unit 22 and the moving parameters MP2 supplied from the MP2 obtaining unit 53, and supplies the difference information MPd to the multiplexer 24.

When parameters of the same type are included in the moving parameters MP1 and the moving parameters MP2, if it is possible to calculate a difference between the parameters, the difference between the parameters can be used as the difference information MPd regarding moving parameter information. When a certain parameter exists in the moving parameters MP1 but a corresponding parameter does no exist in the moving parameters MP2, the parameter existing in the moving parameters MP1 can be used directly as the difference information MPd regarding moving parameter information. That is, the difference information MPd regarding moving parameter information may be any information as long as it is possible to reconstruct the moving parameters MP1 using the difference information MPd regarding moving parameter information and the moving parameters MP2.

As described above, as the difference information MPd as moving parameter information, it is possible to use the difference between parameters in the moving parameters MP1 and the moving parameters MP2, or a moving parameter MP1 itself. Generally, the difference between a moving parameter MP1 and a moving parameter MP2 has a less amount of data than the moving parameter MP1 itself. Thus, when the difference between a moving parameter MP1 and a moving parameter MP2 is recorded on the HDD 14 as moving parameter information, compared with a case where a moving parameter itself is recorded on the HDD 14 as moving parameter information, the storage capacity of the HDD 14 is saved. Furthermore, the time taken to transmit moving parameter information can be reduced.

Figure 11:
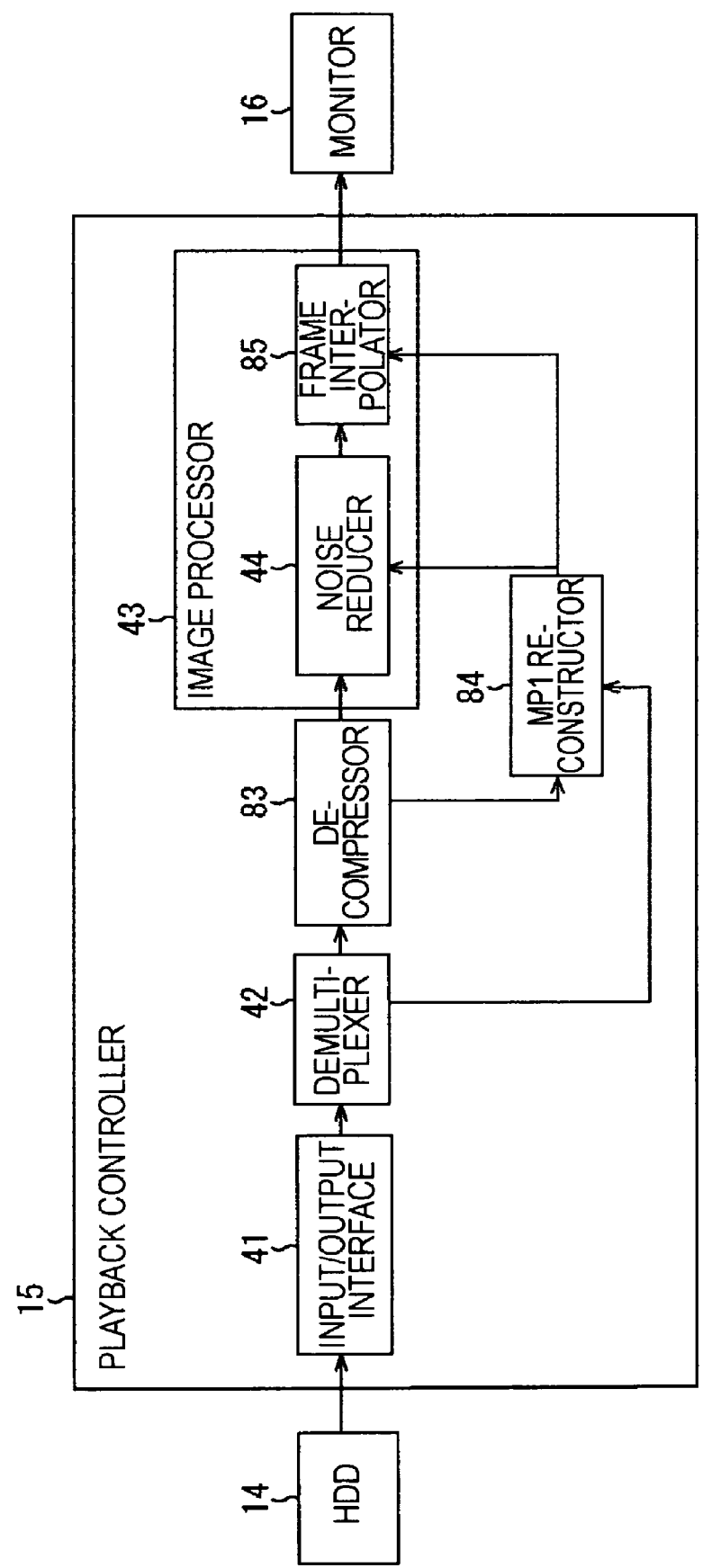
FIG. 11 is a block diagram showing another example configuration of the playback controller shown in FIG. 1.

Furthermore, when the differences from moving parameters MP2 are used as moving parameter information only regarding one or more moving parameters MP1 used in the image processor 43 shown in FIG. 11 among the moving parameters MP1, the time taken to transmit moving parameter information can be further reduced and the storage capacity of the HDD 14 can be further saved.

The compressor 55 compresses the decimated image supplied from the MP2 obtaining unit 53, for example, according to the MPEG scheme, using the moving parameters MP2 also supplied from the MP2 obtaining unit 53, and supplies the resulting compressed data to the multiplexer 24.

In FIG. 6, the multiplexer 24 considers the difference information MPd supplied from the MPd difference information obtaining unit 54 as moving parameter information, multiplexes the difference information MPd as moving parameter information and the compressed data of the decimated image, supplied from the compressor 55, and supplies the resulting multiplexed data to the input/output interface 21.

Next, processing executed in the MPd difference information obtaining unit 54 shown in FIG. 6 will be described with reference to FIG. 7.

As an example, let it be supposed that the frame decimator 52 converts an HD image into a decimated image by executing ½ decimation to reduce two successive frames of an HD image into one frame and that moving vectors are used as moving parameters MP1 and MP2.

Furthermore, the n-th frame of the HD image as counted from the beginning will be denoted as the n-th frame, and a moving vector from the n-th frame to the n'-th frame (n'>n) will be denoted as a moving vector mv(n, n').

Figure 7:
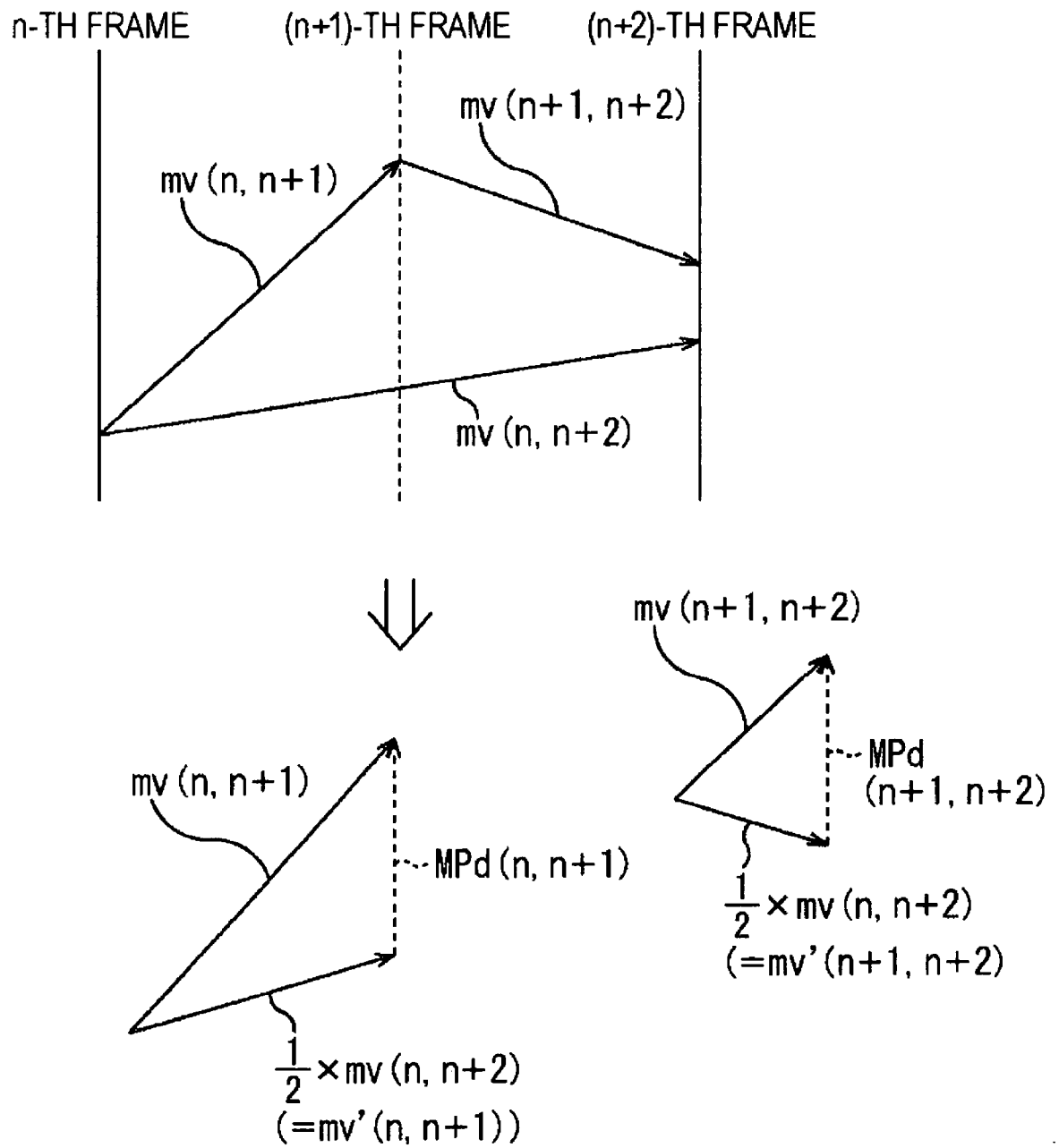
FIG. 7 is a first diagram for explaining an example of processing executed in an MPd difference information obtaining unit shown in FIG. 6.

Now referring to FIG. 7, regarding three successive frames of the HD image, namely, the n-th frame, the (n+1)-th frame, and the (n+2)-th frame, assuming that the (n+1)-th frame is discarded by the decimation for converting the HD image into a decimated image, moving vectors mv(n, n+1) and mv(n+1, n+2) are detected for the HD image, and a moving vector mv(n, n+2) is detected for the decimated image.

On the basis of the moving vector mv(n, n+2) of the decimated image, the MPd difference information obtaining unit 54 calculates ½ of the vector, i.e., ½×mv(n, n+2), as a predictive value mv'(n, n+1) of the moving vector mv(n, n+1) of the HD image and as a predictive value mv'(n+1, n+2) of the moving vector mv(n+1, n+2) of the HD image. Furthermore, the MPd difference information obtaining unit 54 calculates the difference mv(n, n+1)−mv'(n, n+1) between the moving vector mv(n, n+1) and its predictive value mv'(n, n+1), and sets the difference mv(n, n+1)−mv'(n, n+1) as difference information MPd(n, n+1) of the moving vector mv(n, n+1). Also, the MPd difference information obtaining unit 54 calculates the difference mv(n+1, n+2)−mv'(n+1, n+2) between the moving vector mv(n+1, n+2) and its predictive value mv'(n+1, n+2), and sets the difference mv(n+1, n+2)−mv'(n+1, n+2) as difference information MPd(n+1, n+2) of the moving vector mv(n+1, n+2).

The predictive value mv'(n, n+1) of the moving vector mv(n, n+1) of the HD image can be calculated from the moving vector mv(n, n+2) of the decimated image, and the moving vector mv(n, n+1) of the HD image can be calculated from its predictive value mv'(n, n+1) and the difference mv(n, n+1)−mv'(n, n+1) as the difference information MPd(n, n+1) That is, the moving vector mv(n, n+1) of the HD image can be reconstructed (calculated) by adding together the moving vector mv(n, n+2) of the decimated image and the difference mv(n, n+1)−mv'(n, n+1) as the difference information MPd (n, n+1).

Similarly, the moving vector mv(n+1, n+2) of the HD image can be reconstructed using the moving vector mv(n, n+2) of the decimated image and the difference mv(n+1, n+2)−mv'(n+1, n+2) as the difference information MPd(n+1, n+2).

An MP1 reconstructor 84 shown in FIG. 11, which will be described later, reconstructs the moving vectors mv(n, n+1) and mv(n+1, n+2) of the HD image in the manner described above.

In FIG. 7, ideally, equation mv(n, n+1)+mv(n+1, n+2)=mv (n, n+2) is satisfied. In this case, in addition to the moving vector mv(n, n+2) of the decimated image, when one of the two moving vectors mv(n, n+1) and mv(n+1, n+2) of the HD image is available, it is possible to calculate the other moving vector.

Thus, even when the difference information MPd(n, n+1) and the difference information MPd(n+1, n+2) are not both available, when one of these pieces of difference information is available, it is possible to reconstruct a moving vector of the HD image associated with the one piece of difference information using the difference information and the moving vector mv(n, n+2) of the decimated image, and to further reconstruct a moving vector of the HD image associated with the other piece of difference information using the moving vector of the HD image associated with the one piece of difference information and the moving vector mv(n, n+2) of the decimated image.

According to what has been described above, the MPd difference information obtaining unit 54 does not necessarily have to use both the difference information MPd(n, n+1) of the moving vector mv(n, n+1) and the difference information MPd(n+1, n+2) of the moving vector mv(n+1, n+2) as moving parameter information, and it suffices to use one of these pieces of difference information as moving parameter information.

In this case, compared with a case where both the difference information MPd(n, n+1) and the difference information MPd(n+1, n+2) are used as moving parameter information, the amount of data of moving parameter information is reduced. Thus, the time taken to transmit moving parameter information can be further reduced, and the storage capacity of the HDD 14 can be further saved.

Next, processing executed in the MPd difference information obtaining unit 54 shown in FIG. 6 will be further described with reference to FIGS. 8 and 9.

Figure 8:
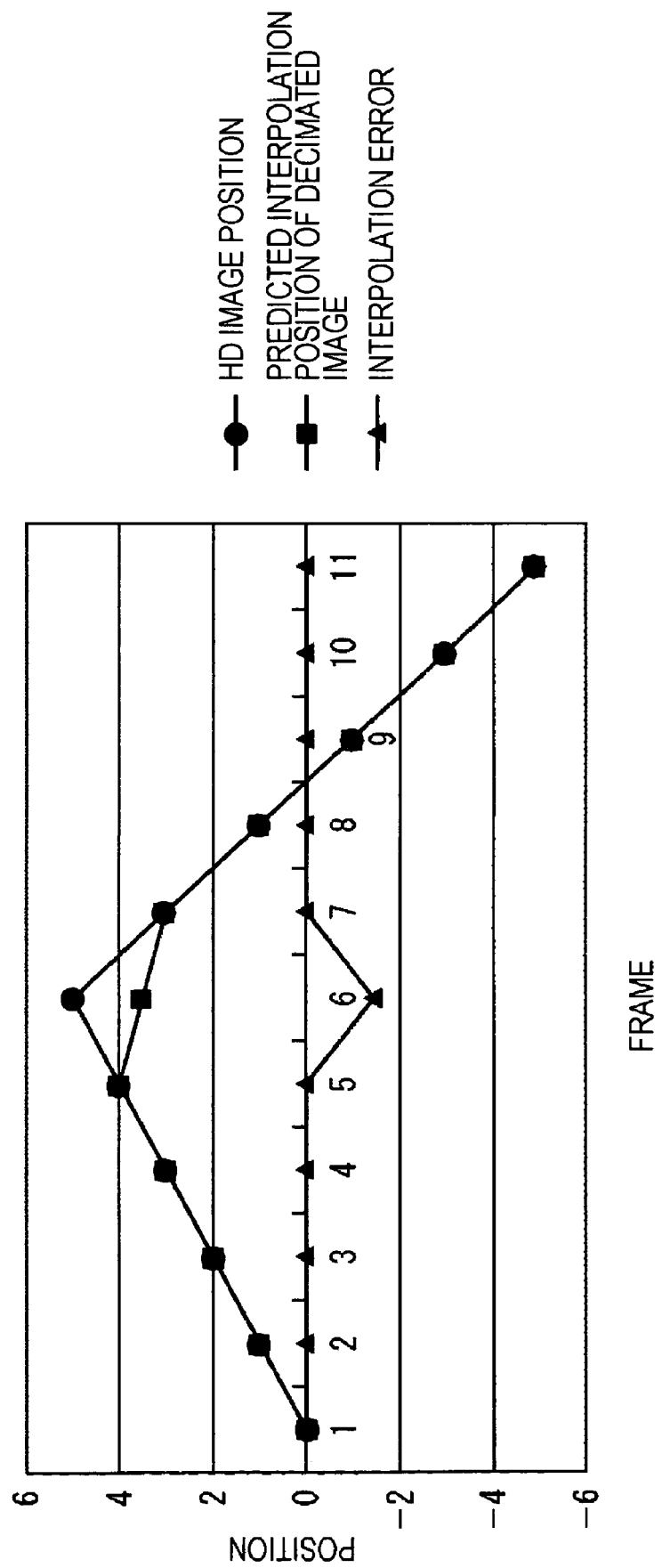
FIG. 8 is a second diagram for explaining an example of processing executed in the MPd difference information obtaining unit shown in FIG. 6.

Also in FIGS. 8 and 9, similarly to FIG. 7, only moving vectors will be considered as a moving parameter MP1 and a moving parameter MP2. Furthermore, let it be supposed that the HD image is composed of 11 frames, and that the frame decimator 52 converts the HD image into a decimated image by executing decimation to discard the even-numbered frames (hereinafter referred to as even frames) of the HD image. Furthermore, let it be supposed that a moving vector is detected regarding a moving object that moves upward at a constant speed of one pixel per frame from the first frame to the sixth frame of the HD image and that moves downward at a constant speed of two pixels per frame from the sixth frame to the eleventh frame of the HD image.

FIG. 8 shows the position of the moving object in each frame of the HD image (hereinafter referred to as an HD image position) relative to the position of the moving object in the first frame, a predicted position of the moving object in each even frame (hereinafter referred to as a predicted interpolation position of the decimated image) between two odd-numbered frames (hereinafter referred to as odd frames) of the HD image as predicted on the basis of a moving vector from the preceding one to the succeeding one of the two odd frames, and an interpolation error representing an error between the HD image position and the predicted interpolation position of the decimated image.

More specifically, in FIG. 8, HD image positions are indicated by marks of black circles, predicted interpolation positions of the decimated image are indicated by marks of black squares, and interpolation errors are indicated by marks of black triangles. Although predicted interpolation positions of the decimated image exist only in the even frames, in FIG. 8, predicted interpolation positions of the decimated image are also indicated for the odd frames for convenience.

As the predicted interpolation position of the decimated image for an even frame, an average of the positions of the moving object in the odd frames preceding and succeeding the even frame is used. As the predicted interpolation position of the decimated image for an odd frame, the HD image position of the odd frame is used directly.

FIG. 9 shows a frame number representing an order of each frame in the HD image, an HD image position, a moving vector representing motion of the moving object in each frame of the HD image, a predicted position of the moving object in a next frame as predicted from the moving vector of each frame of the HD image, a moving vector representing motion of the moving object in each frame of the decimated image, a predicted position of the decimated image representing the position of the moving object in a next frame as predicted from the moving vector of each frame of the decimated image, a predicted interpolation position of the decimated image, and an interpolation error.

More specifically, in FIG. 9, the first field (column) from the left represents a frame number of a frame of the HD image, and the second field from the left represents a position of the moving object in each frame of the HD image. The third field from the left represents a moving vector of the moving object, detected for each frame of the HD image, and the fourth field from the left represents a predicted position of the moving object in a next frame of the HD image as predicted from the moving vector of the moving object in each frame of the HD image.

Furthermore, the fifth field from the left represents a moving vector of the moving object, detected for each frame of the decimated image, and the sixth field from the left represents a predicted position of the decimated image of the moving object in a next frame of the decimated image as predicted from the moving vector of the moving object in each frame of the decimated image. The seventh field from the left represents a predicted interpolation position of the decimated image, and the eighth field from the left (the first field from the right) represents an interpolation error.

In FIGS. 8 and 9, the predicted interpolation position of the decimated image for an even frame is an average of the positions of the moving object in the odd frames preceding and succeeding the even frame, as described earlier. Thus, when the speed of the moving object changes, a non-zero interpolation error occurs due to the change.

More specifically, in FIGS. 8 and 9, the speed of the moving object changes in the sixth frame (the frame with a frame number of 6) of the HD image, and an interpolation error of −1.5 occurs due to the change.

The difference information MPd obtained by the MPd difference information obtaining unit 54 corresponds to this interpolation error. By using the difference information MPd corresponding to the interpolation error and a moving vector obtained from the decimated image (a predicted interpolation position of the decimated image as predicted from the moving vector), it is possible to reconstruct (obtain) an accurate moving vector of the HD image.

Figure 10:
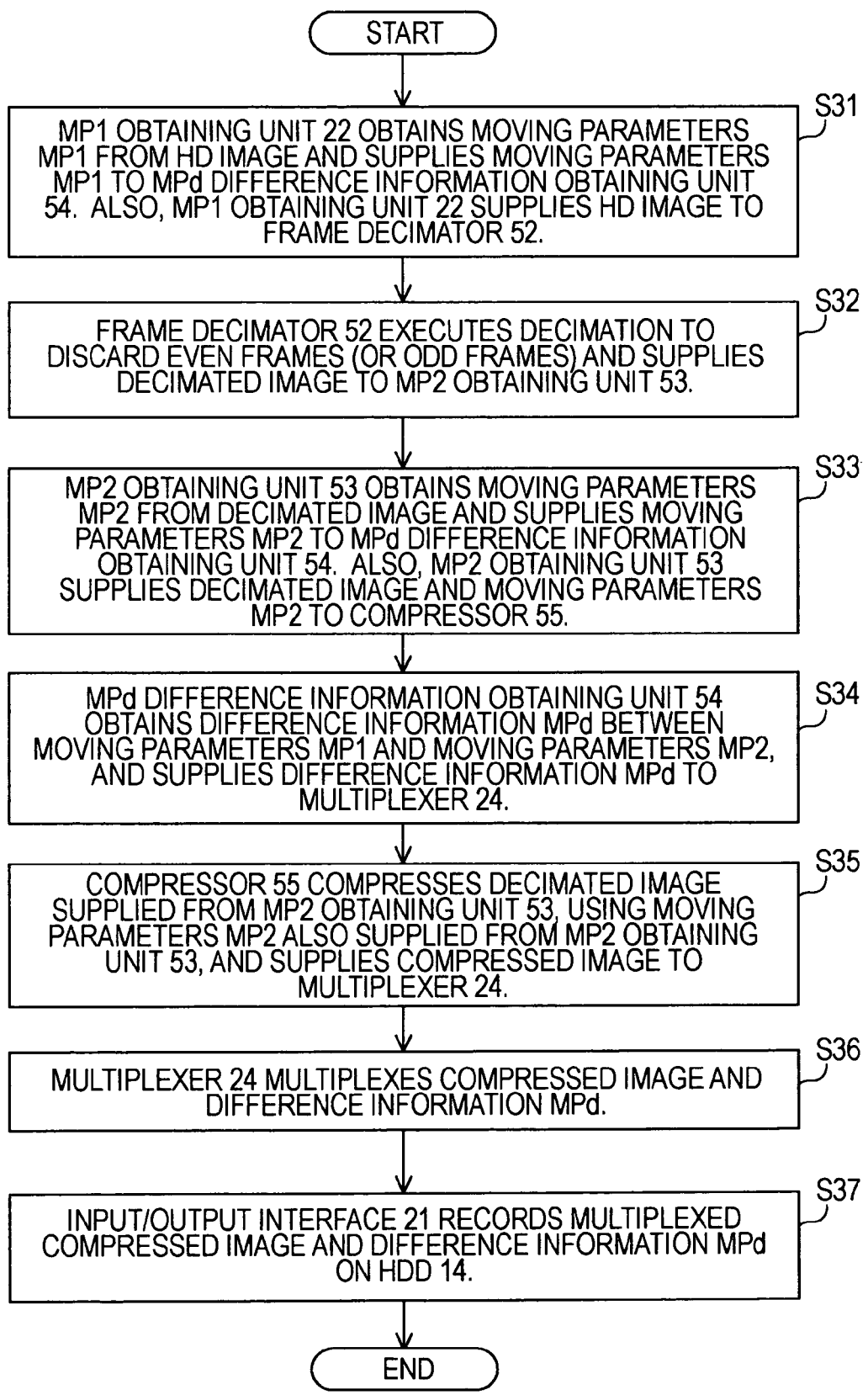
FIG. 10 is a flowchart showing processing executed in the recording controller shown in FIG. 6.

Next, processing executed in the recording controller 13 shown in FIG. 6 will be described with reference to a flow-chart shown in FIG. 10.

When an HD image has been supplied from the HDTV camera 12 to the recording controller 13, the recording controller 13 receives the HD image and supplies the HD image to the HDD 14 so that the HD image is recorded on the HDD 14. Then, the recording controller 13 executes processing according to the flowchart shown in FIG. 10, for example, when a user has performed an operation on an operating unit (not shown) or when (substantially) no processing that is to be executed exists.

More specifically, the input/output interface 21 reads an HD image from the HDD 14 and supplies the HD image to the MP1 obtaining unit 22. In step S31, the MP1 obtaining unit 22 obtains moving parameters MP1 from the HD image supplied from the input/output interface 21, and supplies the moving parameters MP1 to the MPd difference information obtaining unit 54. Also, the MP1 obtaining unit 22 supplies the HD image to the frame decimator 52. The processing then proceeds to step S32.

In step S32, the frame decimator 52 executes decimation to discard the even frames (or odd frames) of the HD image supplied from the MP1 obtaining unit 22, and supplies the resulting decimated image to the MP2 obtaining unit 53. The processing then proceeds to step S33.

In step S33, the MP2 obtaining unit 53 obtains moving parameters MP2 from the decimated image supplied from the frame decimator 52, and supplies the moving parameters MP2 to the MPd difference information obtaining unit 54. Also, the MP2 obtaining unit 53 supplies the decimated image and the moving parameters MP2 to the compressor 55. The processing then proceeds to step S34.

In step S34, the MPd difference information obtaining unit 54 calculates and thereby obtains difference information MPd regarding one or more differences between the moving parameters MP1 supplied from the MP1 obtaining unit 22 and the moving parameters MP2 supplied from the MP2 obtaining unit 53, and supplies the difference information MPd to the multiplexer 24. The processing then proceeds to step S35.

In step S35, the compressor 55 compresses the decimated image supplied from the MP2 obtaining unit 53, for example, according to the MPEG scheme, using the moving parameters MP2 also supplied from the MP2 obtaining unit 53, and supplies the resulting compressed data of the decimated image to the multiplexer 24. The processing then proceeds to step S36.

In step S36, the multiplexer 24 multiplexes the difference information MPd, supplied from the MPd difference information obtaining unit 54, and the compressed data of the decimated image, supplied from the compressor 55, and supplies the resulting multiplexed data to the input/output interface 21. The processing then proceeds to step S37.

In step S37, the input/output interface 21 supplies the multiplexed data, supplied from the multiplexer 24, to the HDD 14 so that the multiplexed data is recorded on the HDD 14. The processing is then ended.

FIG. 11 is a block diagram showing an example configuration of the playback controller 15 shown in FIG. 1 in a case where the recording controller 13 is configured as shown in FIG. 6. In FIG. 11, parts corresponding to those shown in FIG. 4 are designated by the same numerals, and descriptions thereof will be omitted as appropriate.

The playback controller 15 shown in FIG. 11 includes a frame interpolator instead of the interpolator 45 shown in FIG. 4, and newly includes a decompressor 83 and an MP1 reconstructor 84. The playback controller 15 shown in FIG. 11 is configured otherwise the same as that shown in FIG. 4.

The decompressor 83 decompresses the compressed data of the decimated image, supplied from the demultiplexer 42, according to a decompression scheme corresponding to the compression scheme employed by the compressor 55 shown in FIG. 6, and supplies the resulting decimated image to the image processor 43.

More specifically, referring to FIG. 11, multiplexed data obtained by multiplexing the compressed data of the decimated image, obtained by the compressor 55 shown in FIG. 6, and the difference information MPd as moving parameter information, obtained by the MPd difference information obtaining unit 54, has been recorded on the HDD 14. The demultiplexer 42 demultiplexes the multiplexed data into the compressed data and the difference information MPd, and supplies the compressed data to the decompressor 83 and supplies the difference information to the MP1 reconstructor 84. The decompressor 83 decompresses the compressed data supplied from the demultiplexer 42 as described above into the decimated image, and supplies the decimated image to the image processor 43.

As described earlier, the compressor 55 shown in FIG. 6 compresses the decimated image, for example, according to the MPEG scheme, using the moving parameters MP2 obtained from the decimated image. Thus, the moving parameters MP2 used for compression of the decimated image are included in the compressed data of the decimated image. The decompressor 83 decompresses the compressed data using the moving parameters MP2. Then, the decompressor 83 supplies the moving parameters MP2 used for decompression of the compressed data to the MP1 reconstructor 84.

The MP1 reconstructor 84 reconstructs the highly accurate moving parameters MP1 from the difference information MPd supplied from the demultiplexer 42 and the moving parameters MP2 supplied from the decompressor 83, and supplies the moving parameters MP1 to the image processor 43.

The frame interpolator 85 executes interpolation to interpolate frames on the decimated image supplied from the decompressor 83 (via the noise reducer 44), using, for example, a moving vector among the highly accurate moving parameters MP1 supplied from the MP1 reconstructor 84, thereby converting the decimated image into a high-quality HD image, and supplies the HD image to the monitor 16.

Figure 12:
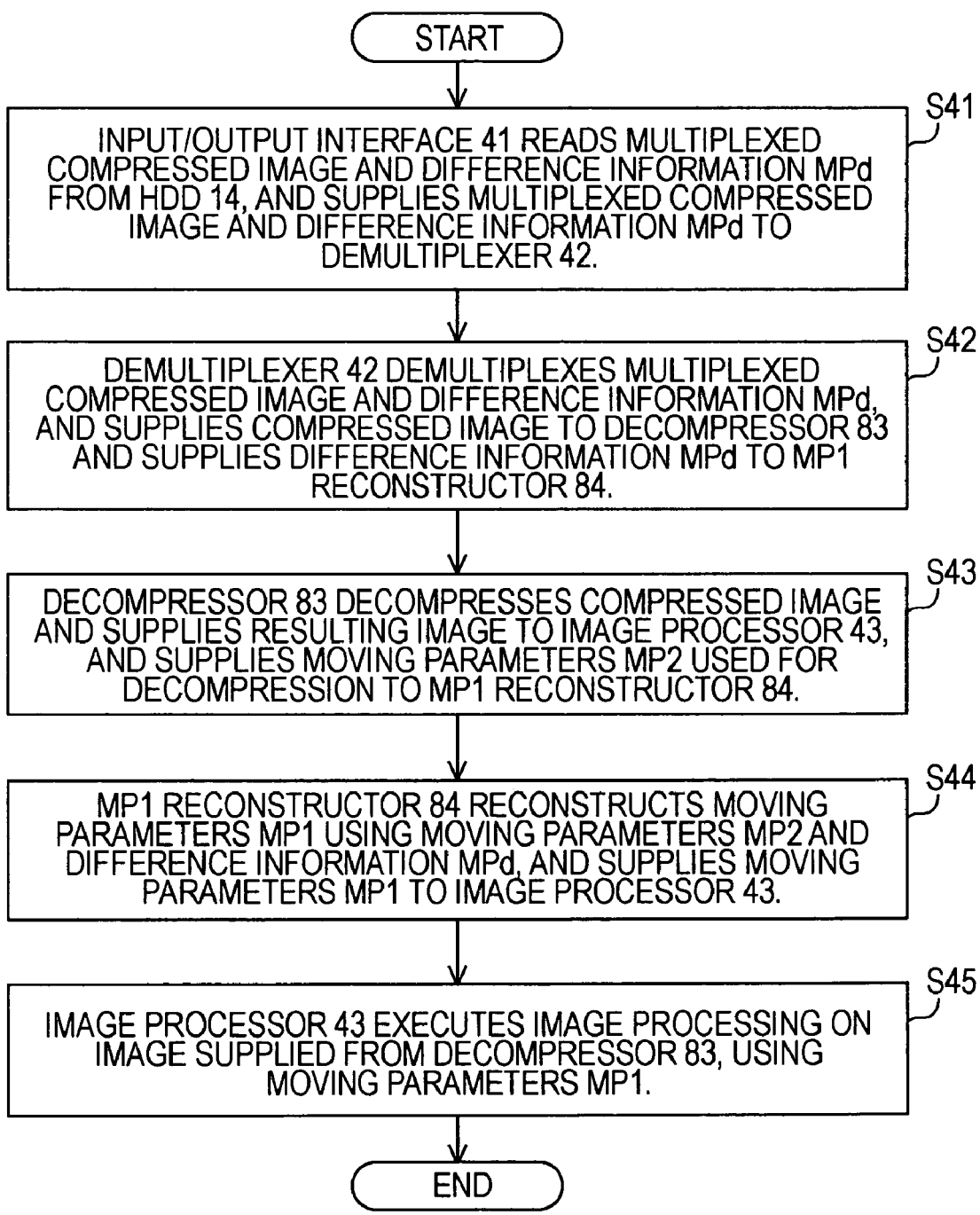
FIG. 12 is a flowchart showing processing executed in the playback controller shown in FIG. 11.

Next, processing executed in the playback controller 15 shown in FIG. 11 will be described with reference to a flowchart shown in FIG. 12.

When an image playback instruction is issued to the input/output interface 41, for example, when the user has performed an operation on an operating unit (not shown), in step S41, the input/output interface 41 reads multiplexed data from the HDD 14 and supplies the multiplexed data to the demultiplexer 42. The processing then proceeds to step S42.

In step S42, the demultiplexer 42 demultiplexes the multiplexed data supplied from the input/output interface 41 into compressed data of a decimated image and difference information MPd. Furthermore, the demultiplexer 42 supplies the decimated image to the decompressor 83 and supplies the difference information MPd to the MP1 reconstructor 84. The processing then proceeds to step S43.

In step S43, the decompressor 83 decompresses the compressed data of the decimated image, supplied from the demultiplexer 42, according to a decompression scheme corresponding to the compression scheme employed by the compressor 55 shown in FIG. 6, and supplies the resulting decimated image to the image processor 43. Furthermore, the decompressor 83 supplies moving parameters MP2 used for decompression of the compressed data of the decimated image to the MP1 reconstructor 84. The processing then proceeds to step S44.

In step S44, for example, as described with reference to FIG. 7, the MP1 reconstructor 84 reconstructs (obtains) highly accurate moving parameters MP1 using the difference information MPd supplied from the demultiplexer 42 and the moving parameters MP2 supplied from the decompressor 83, and supplies the moving parameters MP1 to the image processor 43. The processing then proceeds to step S45.

In step S45, the image processor 43 executes image processing on the decimated image supplied from the decompressor 83, using the moving parameters MP1 supplied from the MP1 reconstructor 84, and supplies the resulting image to the monitor 16. The processing is then ended.

FIG. 13 is a block diagram showing yet another example configuration of the recording controller 13 shown in FIG. 1. In FIG. 13, parts corresponding to those shown in FIG. 2 or FIG. 6 are designated by the same numerals, and descriptions thereof will be omitted as appropriate.

The recording controller 13 shown in FIG. 13 includes a down-converter 102, an MP2 obtaining unit 103, an MPd difference information obtaining unit 104, and a compressor 105 instead of the frame decimator 52, the MP2 obtaining unit 53, the MPd difference information obtaining unit 54, and the compressor 55 shown in FIG. 6. The recording controller 13 shown in FIG. 13 is configured otherwise the same as that shown in FIG. 6.

The down-converter 102 receives an HD image from the MP1 obtaining unit 22. The down-converter 102 executes decimation to discard pixels of each frame of the HD image supplied from the MP1 obtaining unit 22, thereby converting the HD image into an SD (standard definition) image, which is a decimated image composed of a less amount of data, and supplies the SD image to the MP2 obtaining unit 103 and the compressor 105.

The MP2 obtaining unit 103 detects (calculates) and thereby obtains moving parameters MP2 from the SD image supplied from the down-converter 102, and supplies the moving parameters MP2 to the MPd difference information obtaining unit 104.

The MPd difference information obtaining unit 104 receives the moving parameters MP2 from the MP2 obtaining unit 103, and receives moving parameters MP1 from the MP1 obtaining unit 22. Furthermore, similarly to the MPd difference information obtaining unit 54 shown in FIG. 6, the MPd difference information obtaining unit 104 obtains difference information MPd regarding the difference between a moving parameter MP1 and a moving parameter MP2 only for each moving parameter MP1 used in the image processor 43 shown in FIG. 16, and supplies the difference information MPd to the multiplexer 24 as moving parameter information.

The compressor 105 receives the SD image from the down-converter 102 and receives the moving parameters MP1 from the MP1 obtaining unit 22. The compressor 105 compresses the SD image supplied from the down-converter 102 into SD-image compressed data, using the moving parameters MP1 supplied from the MP1 obtaining unit 22, and supplies the SD-image compressed data to the multiplexer 24.

Figure 14:
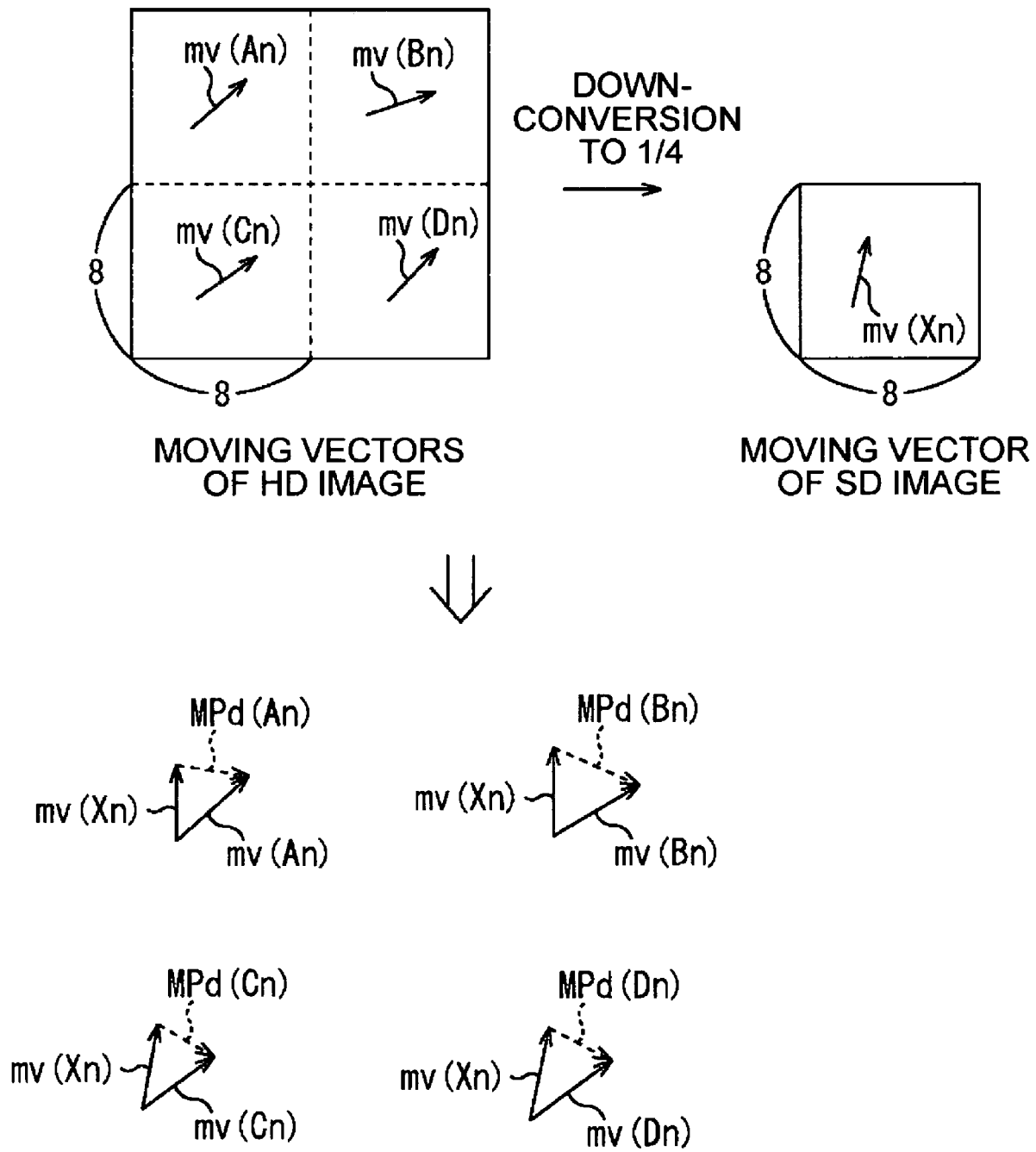
FIG. 14 is a diagram for explaining an example of processing executed in an MPd difference information obtaining unit shown in FIG. 13.

FIG. 14 is a diagram for explaining an example of processing for obtaining difference information MPd, executed in the MPd difference information obtaining unit 104 shown in FIG. 13.

As an example, let it be supposed that an HD image is converted into an SD image, which is a decimated image, through ¼ decimation that reduces four pixels composed of 2×2 pixels of each frame of the HD image into one pixel, and that moving vectors are used as a moving parameter MP1 and a moving parameter MP2. Furthermore, let it be supposed that, as an example, a moving vector is detected for a block composed of 8×8 pixels.

Since the size (number of pixels) of the SD image is ¼ of that of the HD image, one block composed of 8×8 pixels of the SD image corresponds to one macro block composed of 16×16 pixels including four blocks composed of 8×8 pixels of the HD image.

Furthermore, a moving vector in one block composed of 8×8 pixels of the SD image will be denoted as a moving vector $mv(X_n)$, and moving vectors in four blocks, each composed of 8×8 pixels, located at upper left, upper right, lower left, and lower right of the corresponding macro block of the HD image will be denoted as moving vectors $mv(A_n)$, $mv(B_n)$, $mv(C_n)$, and $mv(D_n)$, respectively.

The MPd difference information obtaining unit 104 obtains the difference $mv(A_n)-mv(X_n)$ between the moving vector $mv(A_n)$ of the HD image and the moving vector $mv(X_n)$ of the corresponding SD image, and sets the difference $mv(A_n)-mv(X_n)$ as difference information $MPd(A_n)$ regarding the moving vector $mv(A_n)$. Similarly, the MPd difference information obtaining unit 104 obtains the differences $mv(B_n)-mv(X_n)$, $mv(C_n)-mv(X_n)$, and $mv(D_n)-mv(X_n)$ between the other moving vectors $mv(B_n)$, $mv(C_n)$, and $mv(D_n)$ of the HD image and the moving vector $mv(X_n)$ of the SD image, as difference information $MPd(B_n)$ regarding the moving vector $mv(B_n)$, difference information $MPd(C_n)$ regarding the moving vector $mv(C_n)$, and difference information $MPd(D_n)$ regarding the moving vector $mv(D_n)$, respectively.

The moving vector $mv(A_n)$ of the block composed of 8×8 pixels on the upper left of the macro block of the HD image can be reconstructed (obtained) by adding together the moving vector $mv(X_n)$ of the block composed of 8×8 pixels of the corresponding SD image and the difference $mv(A_n)-mv(X_n)$ as the difference information $MPd(A_n)$.

Similarly, the moving vectors $mv(B_n)$, $mv(C_n)$, and $mv(D_n)$ of the HD image can be reconstructed using the moving vector $mv(X_n)$ of the SD image and the differences $mv(B_n)-mv(X_n)$, $mv(C_N)-mv(X_n)$, and $mv(D_n)-mv(X_n)$ as the difference information MPd, respectively.

An MP1 reconstructor 125 shown in FIG. 16, which will be described later, reconstructs the moving vector $mv(A_n)$ of the HD image using the moving vector $mv(X_n)$ of the SD image and the difference information $MPd(A_n)$ associated with the moving vector $mv(A_n)$ of the HD image as described above. Similarly, the MP1 reconstructor 125 reconstructs the moving vectors $mv(B_n)$, $mv(C_n)$, and $mv(D_n)$ of the HD image using the moving vector $mv(A_n)$ of the SD image and the difference information $MPd(B_n)$, $MPd(C_n)$, and $MPd(D_n)$, respectively.

Figure 15:
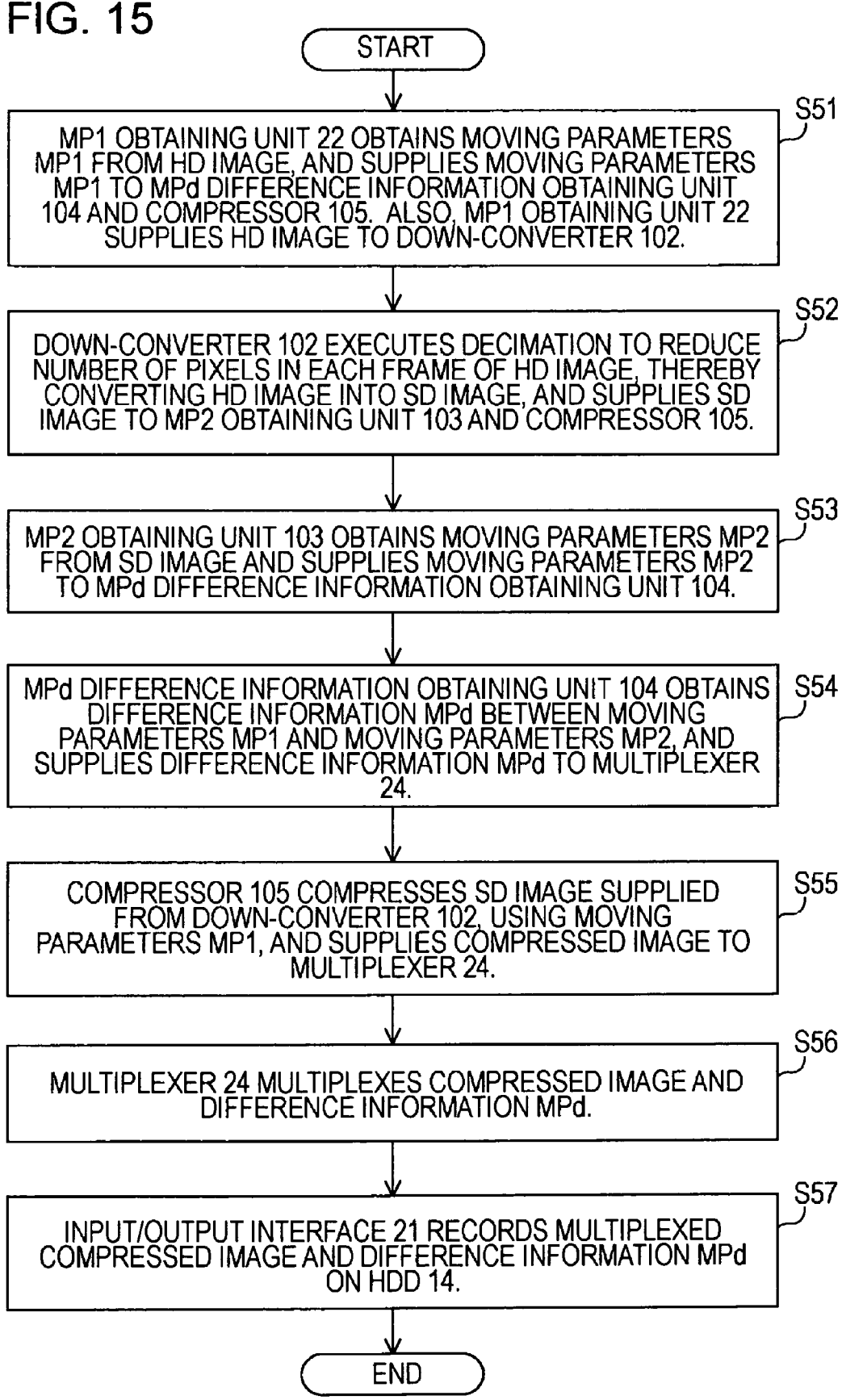
FIG. 15 is a flowchart showing processing executed in the recording controller shown in FIG. 13.

Next, processing executed in the recording controller 13 shown in FIG. 13 will be described with reference to a flowchart shown in FIG. 15.

When an HD image has been supplied from the HDTV camera 12 to the recording controller 13, the recording controller 13 receives the HD image and supplies the HD image to the HDD 14 so that the HD image is recorded on the HDD 14. Then, the recording controller 13 executes processing according to the flowchart shown in FIG. 15, for example, when a user has performed an operation on an operating unit (not shown) or when (substantially) no processing that is to be executed exists.

More specifically, the input/output interface 21 reads an HD image from the HDD 14 and supplies the HD image to the MP1 obtaining unit 22. In step S51, the MP1 obtaining unit 22 obtains moving parameters MP1 from the HD image supplied from the input/output interface 21, and supplies the moving parameters MP1 to the MPd difference information obtaining unit 104 and the compressor 105. Also, the MP1 obtaining unit 22 supplies the HD image, supplied from the input/output interface 21, to the down-converter 102. The processing then proceeds to step S52.

In step S52, the down-converter 102 decimates the pixels of each frame of the HD image supplied from the MP1 obtaining unit 22, thereby converting the HD image into an SD image, which is a decimated image composed of a less amount of data, and supplies the SD image to the MP2 obtaining unit 103 and the compressor 105. The processing then proceeds to step S53.

In step S53, the MP2 obtaining unit 103 obtains moving parameters MP2 from the SD image supplied from the down-converter 102, and supplies the moving parameters MP2 to the MPd difference information obtaining unit 104. The processing then proceeds to step S54.

In step S54, the MPd difference information obtaining unit 104 obtains difference information MPd regarding one or more differences between the moving parameters MP1 supplied from the MP1 obtaining unit 22 and the moving parameters MP2 supplied from the MP2 obtaining unit 103, and supplies the difference information MPd to the multiplexer 24. The processing then proceeds to step S55.

In step S55, the compressor 105 compresses the SD image supplied from the down-converter 102, using the moving parameters MP1 supplied from the MP1 obtaining unit 22, and supplies the resulting SD-image compressed data to the multiplexer 24. The processing then proceeds to step S56.

For example, in a case where the SD image has been obtained by decimating the pixels of the HD image to ¼ in the down-converter 102 and one moving vector as a moving parameter MP2 corresponds to four moving vectors as moving parameters MP1 as described with reference to FIG. 14, when the compressor 105 executes compression using a moving vector of the HD image, for example, according to the MPEG scheme, an average or the like of the four moving vectors as moving vectors MP1 corresponding to the one moving vector as the moving parameter MP2 is used as the moving vector of the HD image.

In step S56, the multiplexer 24 multiplexes the difference information MPd as moving parameter information, supplied from the MPd difference information obtaining unit 104, and the SD-image compressed data, supplied from the compressor 105, and supplies the resulting multiplexed data to the input/output interface 21. The processing then proceeds to step S57.

In step S57, the input/output interface 21 supplies the multiplexed data, supplied from the multiplexer 24, to the HDD 14 so that the multiplexed data is recorded on the HDD 14. The processing is then ended.

Figure 16:
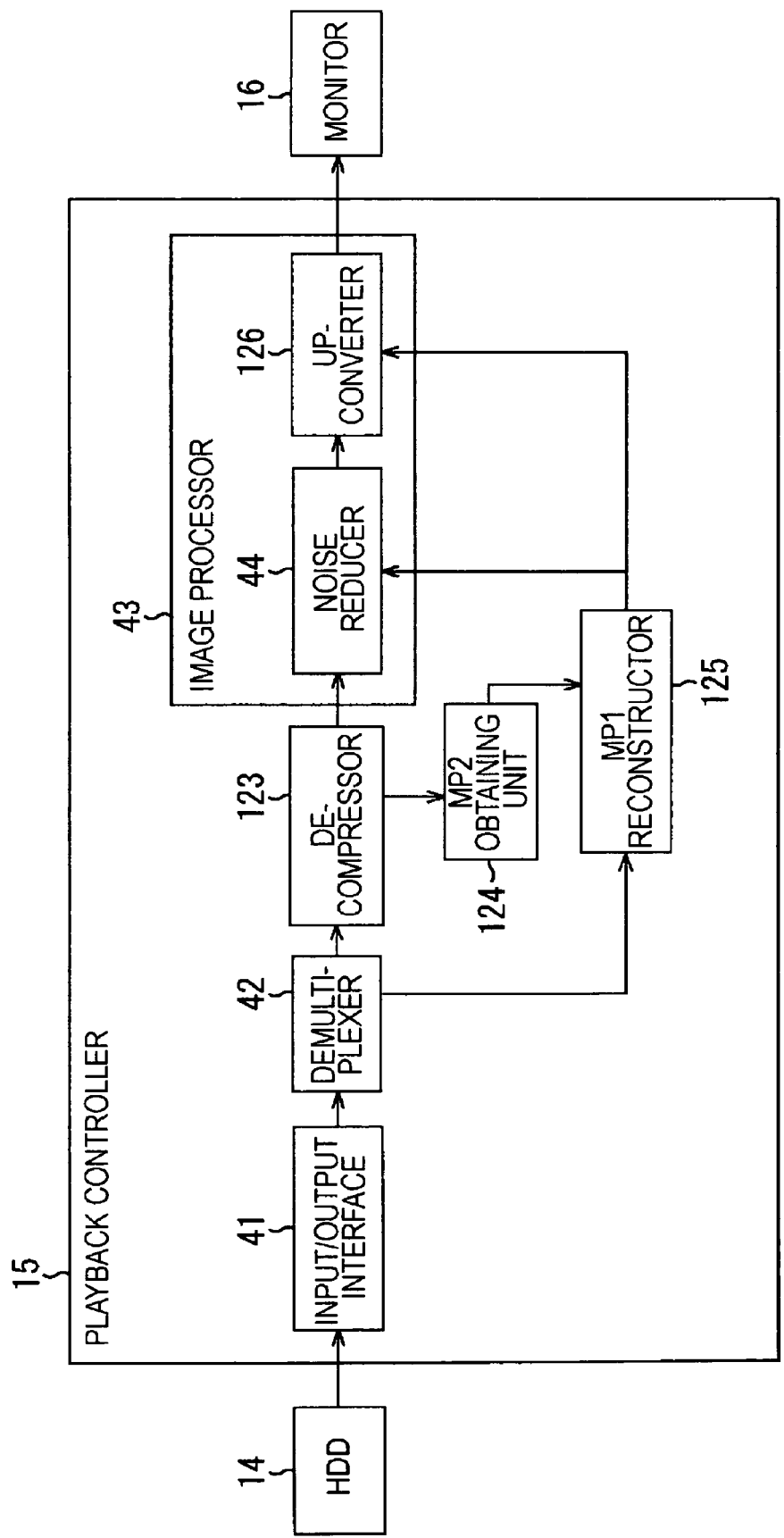
FIG. 16 is a block diagram showing yet another example configuration of the playback controller shown in FIG. 1.

FIG. 16 is a block diagram showing an example configuration of the playback controller 15 shown in FIG. 1 in a case where the recording controller 13 is configured as shown in FIG. 13. In FIG. 16, parts corresponding to those shown in FIG. 11 are designated by the same numerals, and descriptions thereof will be omitted as appropriate.

The playback controller 15 shown in FIG. 16 includes a decompressor 123, an MP1 reconstructor 125, and an up-converter 126 instead of the decompressor 83, the MP1 reconstructor 84, and the frame interpolator 85 shown in FIG. 11, and newly includes an MP2 obtaining unit 124. The playback controller 15 shown in FIG. 16 is configured otherwise the same as that shown in FIG. 11.

The decompressor 123 receives SD-image compressed data from the demultiplexer 42. The decompressor 123 decompresses the SD-image compressed data supplied from the demultiplexer 42, according to a decompression scheme corresponding to the compression scheme employed by the compressor 105 shown in FIG. 13, and supplies the resulting SD image to the image processor 43 and the MP2 obtaining unit 124.

The MP2 obtaining unit 124 detects (calculates) and thereby obtains moving parameters MP2 from the SD image supplied from the decompressor 83, and supplies the moving parameters MP2 to the MP1 reconstructor 125.

The MP1 reconstructor 125 calculates and thereby obtains highly accurate moving parameters MP1 using the difference information MPd supplied from the demultiplexer 42 and the moving parameters MP2 supplied from the MP2 obtaining unit 124, and supplies the moving parameters MP1 to the image processor 43.

The up-converter 126 receives the moving parameters MP1 from the MP1 reconstructor 125, and receives the SD image from the decompressor 123 (via the noise reducer 44). The up-converter 126 executes image processing on the SD image supplied from the decompressor 123 to increase the number of pixels, i.e., executes interpolation of pixels, using the moving parameters MP1 supplied from the MP1 reconstructor 125.

Figure 17:
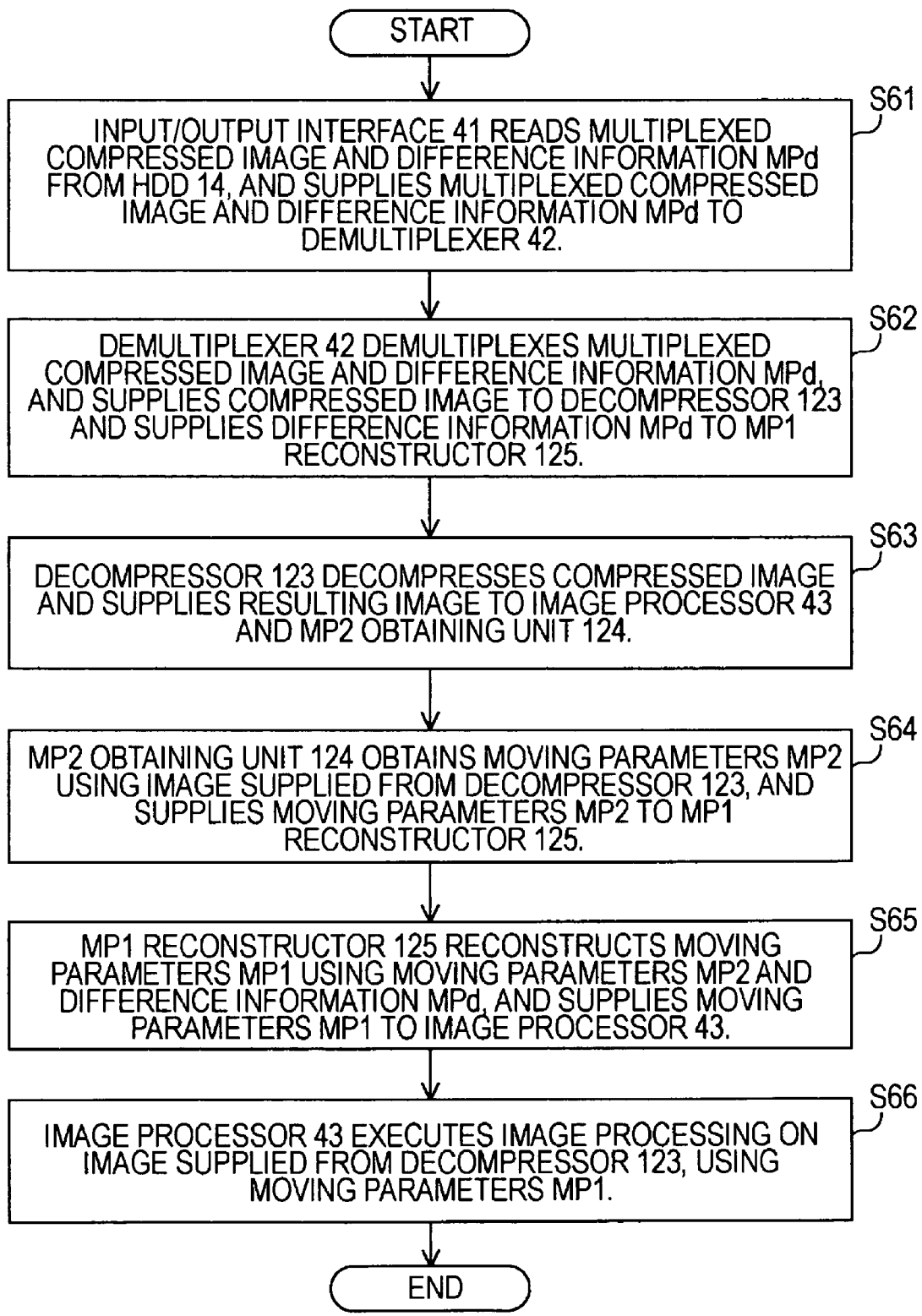
FIG. 17 is a flowchart showing processing executed in the playback controller shown in FIG. 16.

Next, processing executed in the playback controller 15 shown in FIG. 16 will be described with reference to a flowchart shown in FIG. 17.

When an image playback instruction is issued to the input/output interface 41, for example, when a user has performed an operation on an operating unit (not shown), in step S61, the input/output interface 41 reads multiplexed data from the HDD 14 and supplies the multiplexed data to the demultiplexer 42. The processing then proceeds to step S62.

In step S62, the demultiplexer 42 demultiplexes the multiplexed data supplied from the input/output interface 41 into SD-image compressed data and difference information MPd. Furthermore, the demultiplexer 42 supplies the SD-image compressed data to the decompressor 123 and supplies the difference information MPd to the MP1 reconstructor 125. The processing then proceeds to step S63.

In step S63, the decompressor 123 decompresses the SD-image compressed data supplied from the demultiplexer 42 according to a decompression scheme corresponding to the compression scheme employed by the compressor 105 shown in FIG. 13, and supplies the resulting SD image to the image processor 43 and the MP2 obtaining unit 124. The processing then proceeds to step S64.

In step S64, the MP2 obtaining unit 124 detects (calculates) and thereby obtains moving parameters MP2 from the SD image supplied from the decompressor 123, and supplies the moving parameters MP2 to the MP1 reconstructor 125. The processing then proceeds to step S65.

In step S65, the MP1 reconstructor 125 reconstructs (obtains) highly accurate moving parameters MP1 using the difference information MPd supplied from the demultiplexer 42 and the moving parameters MP2 supplied from the MP2 obtaining unit 124, and supplies the moving parameters MP1 to the image processor 43. The processing then proceeds to step S66.

In step S66, the image processor 43 executes image processing on the SD image supplied from the decompressor 123, using the moving parameters MP1 supplied from the MP1 reconstructor 125, and supplies the resulting image to the monitor 16. The processing is then ended.

FIG. 18 is a block diagram showing an example configuration of a recording and playback system according to another embodiment of the present invention.

The recording and playback system includes a recording apparatus 141, an HDTV camera 142, a playback apparatus 151, and a monitor 155. The recording apparatus 141 includes a recording controller 143, an HDD 144, and a transmission controller 145. The playback apparatus 151 includes a reception controller 152, an HDD 153, and a playback controller 154.

The HDTV camera 142 is configured the same as the HDTV camera 12 shown in FIG. 1. The recording controller 143 is configured the same as the recording controller 13 shown in FIG. 1.

The HDD 144 records multiplexed data supplied from the recording controller 143, similarly to the HDD 14 shown in FIG. 1.

The transmission controller 145 exercises control to transmit the multiplexed data read from the HDD 144 to the playback apparatus 151 via, for example, the Internet, a LAN (Local Area Network), or a network compliant with the IEEE (Institute of Electrical and Electronic Engineers) 1394 or USB (Universal Serial Bus) standard.

The reception controller 152 controls, for example, reception of multiplexed data transmitted from the recording apparatus 141, and supplies the multiplexed data to the HDD 153 so that the multiplexed data is recorded on the HDD 153.

The HDD 153 records the multiplexed data supplied from the reception controller 152, similarly to the HDD 14 shown in FIG. 1.

The playback controller 154 reads the multiplexed data recorded on the HDD 153 from the HDD 153, executes processing similarly to the playback controller 15 shown in FIG. 1, and supplies the resulting image to the monitor 155. The monitor 155 is configured the same as the monitor 16 shown in FIG. 1.

In the recording and playback system shown in FIG. 18, configured as described above, for example, an HD image is supplied from the HDTV camera 142 to the recording controller 143 of the recording apparatus 141. The recording controller 143 executes processing on the HD image supplied from the HDTV camera 142, similarly to the recording controller 13 shown in FIG. 1, and supplies the resulting multiplexed data to the HDD 144 so that the multiplexed data is recorded on the HDD 144. The transmission controller 145 reads the multiplexed data recorded on the HDD 144, and transmits the multiplexed data to the reception controller 152 of the playback apparatus 151 via a network or the like.

The reception controller 152 of the playback apparatus 151 receives the multiplexed data transmitted from the recording apparatus 141, and supplies the multiplexed data to the HDD 153 so that the multiplexed data is recorded on the HDD 153. The playback controller 154, as needed, reads the multiplexed data recorded on the HDD 153, executes processing similarly to the playback controller 15 shown in FIG. 1, and outputs the resulting image to the monitor 155.

Figure 19:
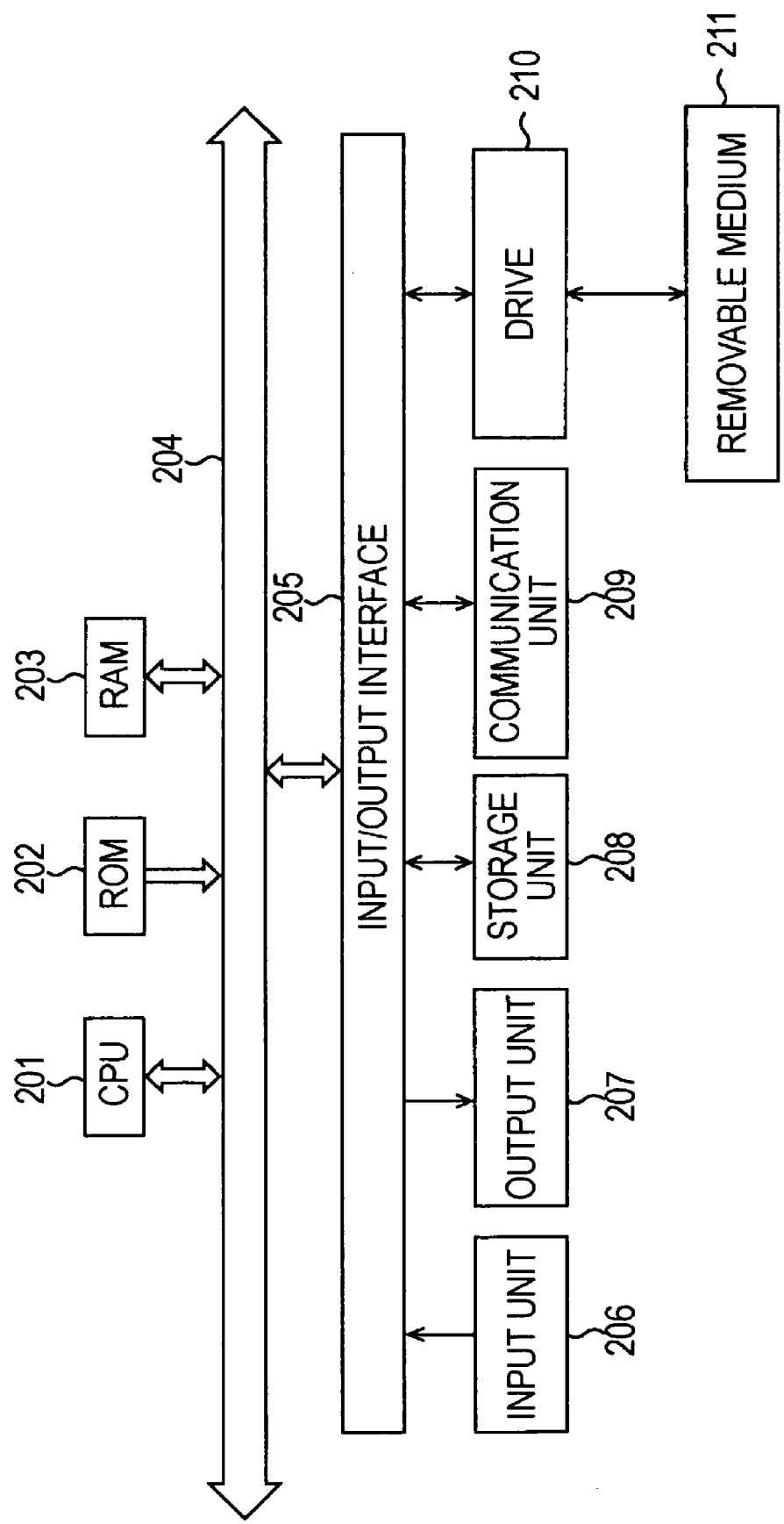
FIG. 19 is a diagram showing an example configuration of a computer according to an embodiment of the present invention.

FIG. 19 is a block diagram showing an example configuration of a computer that executes the series of processes described above according to programs.

A CPU (Central Processing Unit) 201 executes various processes according to programs stored in a ROM (Read Only Memory) 202 or a storage unit 208. A RAM (Random Access Memory) 203 stores programs executed by the CPU 201, data, etc., as needed. The CPU 201, the ROM 202, and the RAM 203 are connected to each other via a bus 204.

As the CPU 201, it is possible to employ "Cell" described in "Cell tanjou" (Birth of Cell), Nikkei Electronics, Nikkei Business Publications, Inc., Feb. 28, 2005, pp. 89-117.

The CPU 201 is also connected to an input/output interface 205 via the bus 204. The input/output interface 205 is connected to an input unit 206 including, for example, a keyboard, a mouse, a microphone, etc., and an output unit 207 including, for example, a display, a speaker, etc. The CPU 201 executes various processes according to instructions input from the input unit 206. Then, the CPU 201 outputs results of the processes to the output unit 207.

The input/output interface 205 is also connected to the storage unit 208. The storage unit 208 is formed of, for example, a hard disc, and the storage unit 208 stores programs executed by the CPU 201 and various types of data. A communication unit 209 carries out communications with external devices via a network, such as the Internet or a local area network.

Also, programs may be obtained via the communication unit 209 and stored in the storage unit 208.

Furthermore, a drive 210 is connected to the input/output interface 205. The drive 210 drives a removable medium 211 when the removable medium 211 is mounted thereon, such as a magnetic disc, an optical disc, a magneto-optical disc, or a semiconductor memory, to obtain programs, data, or the like recorded thereon. The programs or data obtained are transferred to and stored in the storage unit 208 as needed.

The series of processes described above may be executed by hardware or by software. When the series of processes are executed by software, programs constituting the software are installed from a program recording medium onto a computer embedded in special hardware or onto a general-purpose computer or the like that is capable of executing various functions with various programs installed thereon.

The program recording medium for storing programs that are installed on a computer so that the programs can be executed by the computer is, for example, the removable medium 211, which is a package medium formed of a magnetic disc (e.g., a flexible disc), an optical disc (e.g., a CD-ROM (Compact Disc-Read Only Memory), a DVD (Digital Versatile Disc), or a magneto-optical disc), a semiconductor memory, or the like, or the ROM 202, the hard disc of the storage unit 208, or the like temporarily or permanently storing the programs, as shown in FIG. 19. The programs may be stored on the program recording medium as needed via the communication unit 209, which is an interface, such as a router or a modem, or via a wired or wireless communication medium, such as a local area network, the Internet, or digital satellite broadcasting.

Steps defining the programs stored on the program recording medium may include processes that are not necessarily executed sequentially but executed in parallel or individually, as well as processes that are executed sequentially in the orders described.

In this specification, a system refers to the entirety of a plurality of apparatuses.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording and playback apparatus for recording an image on a recording medium and playing back the image from the recording medium, the recording and playback apparatus comprising:
    first obtaining means for obtaining one or more moving parameters regarding motion from a high definition (HD) image;
    converting means for converting the first image into a decimated image composed of a lesser amount of data than the HD image by frame decimating the HD image;

second obtaining means for obtaining one or more moving parameters from the decimated image; and difference information obtaining means for obtaining difference information regarding one or more differences between the moving parameters of the HD image and the moving parameters of the decimated image;

compressing means for compressing the decimated image into compressed data using the moving parameters obtained from the decimated image;

multiplexing means for multiplexing the compressed data and the difference information into multiplexed information; and recording controlling means for recording the multiplexed information on the recording medium;

reading controlling means for reading the multiplexed information from the recording medium;

demultiplexing means for demultiplexing the multiplexed information into the compressed data and the difference information;

decompressing means for decompressing the compressed data into the decimated image and the moving parameters obtained from the decimated image;

reconstructing means for reconstructing the moving parameters of the HD image from the moving parameters obtained from the decimated image and the difference information; and image processing means for executing image processing on the decimated image using the moving parameters of the HD image.

2. The recording and playback apparatus according to claim 1, wherein the moving parameters obtained by the first obtaining means include one or more parameters selected from the group consisting of a moving vector, a level change representing a degree of change in luminance or color signal, a zoom ratio representing a degree of enlargement or reduction, a rotation rate representing a degree of rotation, a frequency band change representing a degree of change in frequency band, and a focus change representing a degree of change in focus.

3. The recording and playback apparatus according to claim 1, wherein the image processing means executes, as the image processing, one or more of frame interpolation, up-conversion, Y/C separation, noise reduction, object extraction, and I/P conversion.

4. The recording and playback apparatus according to claim 1, wherein the difference information obtaining means obtains the difference information regarding only one or more moving parameters used for the image processing executed by the image processing means from among the moving parameters of the HD image.

5. A recording and playback method of a recording and playback apparatus for recording an image on a recording medium and playing back the image from the recording medium, the recording and playback method comprising:

obtaining one or more moving parameters regarding motion from a high definition (HD) image;

converting the HD image into a decimated image composed of a lesser amount of data than the HD image by frame decimating the HD image;

obtaining one or more moving parameters from the decimated image; and obtaining difference information regarding one or more differences between the moving parameters of the HD image and the moving parameters of the decimated image;

compressing the decimated image into compressed data using the moving parameters obtained from the decimated image;

multiplexing the compressed data and the difference information into multiplexed information;

recording the multiplexed information on the recording medium;

reading the multiplexed information from the recording medium;

demultiplexing the multiplexed information into the compressed data and the difference information;

decompressing the compressed data into the decimated image and the moving parameters obtained from the decimated image;

reconstructing the moving parameters of the HD image from the moving parameters obtained from the decimated image and the difference information; and executing image processing on the second image using the moving parameters of the HD image.

6. A processor encoded with a program for executing a recording and playback method for recording an image on a recording medium and playing back the image from the recording medium, the recording and playback method comprising:

obtaining one or more moving parameters regarding motion from a high definition (HD) image;

converting the HD image into a decimated image composed of a lesser amount of data than the HD image by frame decimating the HD image;

obtaining one or more moving parameters from the decimated image; and obtaining difference information regarding one or more differences between the moving parameters of the HD image and the moving parameters of the decimated image;

compressing the decimated image into compressed data using the moving parameters obtained from the decimated image;

multiplexing the compressed data and the difference information into multiplexed information;

recording the multiplexed information on the recording medium;

reading the multiplexed information from the recording medium;

demultiplexing the multiplexed information into the compressed data and the difference information;

decompressing the compressed data into the decimated image and the moving parameters obtained from the decimated image;

reconstructing the moving parameters of the HD image from the moving parameters obtained from the decimated image and the difference information; and executing image processing on the second image using the moving parameters of the HD image.

7. A recording apparatus for recording an image on a recording medium, the recording apparatus comprising:

first obtaining means for obtaining one or more moving parameters regarding motion from a high definition (HD) image;

converting means for converting the HD image into a decimated image composed of a lesser amount of data than the HD image by frame decimating the HD image;

second obtaining means for obtaining one or more moving parameters from the decimated image; and difference information obtaining means for obtaining difference information regarding one or more differences between the moving parameters of the HD image and the moving parameters of the decimated image;

compressing means for compressing the decimated image into compressed data using the moving parameters obtained from the decimated image;

multiplexing means for multiplexing the compressed data and the difference information into multiplexed information; and recording controlling means for recording the multiplexed information on the recording medium.

8. The recording apparatus according to claim 7, further comprising:

transmission controlling means for transmitting the moving parameter information and the second image to another apparatus for playing back an image.

9. The recording apparatus according to claim 7, wherein the moving parameters obtained by the first obtaining means include one or more parameters selected from the group consisting of a moving vector, a level change representing a degree of change in luminance or color signal, a zoom ratio representing a degree of enlargement or reduction, a rotation rate representing a degree of rotation, a frequency band change representing a degree of change in frequency band, and a focus change representing a degree of change in focus.

10. The recording apparatus according to claim 7, wherein when image processing means for executing image processing in a playback apparatus for playing back an image executes image processing on the second image read from the recording medium, the difference information obtaining means obtains the difference information regarding only one or more moving parameters used for the image processing executed by the image processing means from among the moving parameters of the HD image.

11. A recording method of a recording apparatus for recording an image on a recording medium, the recording method comprising:

obtaining one or more moving parameters regarding motion from a high definition (HD) image;

converting the HD image into a decimated image composed of a lesser amount of data than the HD image by frame decimating the HD image;

obtaining one or more moving parameters from the decimated image; and obtaining difference information regarding one or more differences between the moving parameters of the HD image and the moving parameters of the decimated image;

compressing the decimated image into compressed data using the moving parameters obtained from the decimated image;

multiplexing the compressed data and the difference information into multiplexed information; and recording the multiplexed information on the recording medium.

12. A processor encoded with a program for executing a recording method for recording an image on a recording medium, the recording method comprising:

obtaining one or more moving parameters regarding motion from a high definition (HD) image;

converting the HD image into a decimated image composed of a lesser amount of data than the HD image by frame decimating the HD image;

obtaining one or more moving parameters from the decimated image; and obtaining difference information regarding one or more differences between the moving parameters of the HD image and the moving parameters of the decimated image;

compressing the decimated image into compressed data using the moving parameters obtained from the decimated image;

multiplexing the compressed data and the difference information into multiplexed information; and recording the multiplexed information on the recording medium.

13. A playback apparatus for playing back an image, the playback apparatus comprising:

reading controlling means for reading multiplexed information from a recording medium;

demultiplexing means for demultiplexing the multiplexed information into compressed data and difference information;

decompressing means for decompressing the compressed data into a decimated image and into moving parameters obtained from the decimated image, the moving parameter information relating to one or more moving parameters of a high definition (HD) image, and the decimated image being obtained by reducing the amount of data of the HD image by frame decimating the HD image;

reconstructing means for reconstructing the moving parameters of the HD image from the moving parameters obtained from the decimated image and the difference information; and image processing means for executing image processing on the decimated image using the moving parameters of the HD image.

14. The playback apparatus according to claim 13, further comprising:

reception controlling means for receiving the moving parameter information and the second image transmitted from another apparatus, wherein the moving parameter information and the second image received by the reception controlling means are recorded on the recording medium.

15. The playback apparatus according to claim 13, wherein the image processing means executes, as the image processing, one or more of frame interpolation, up-conversion, Y/C separation, noise reduction, object extraction, and I/P conversion.

16. A playback method of a playback apparatus for playing back an image, the playback method comprising:

reading multiplexed information from a recording medium;

demultiplexing the multiplexed information into compressed data and difference information;

decompressing the compressed data into a decimated image and into moving parameters obtained from the decimated image, the moving parameter information relating to one or more moving parameters of a high definition (HD) image, and the decimated image being obtained by reducing the amount of data of the HD image by frame decimating the HD image;

reconstructing the moving parameters of the HD image from the moving parameters obtained from the decimated image and the difference information; and executing image processing on the decimated image using the moving parameters of the HD image.

17. A processor encoded with a program for executing a playback method for playing back an image, the playback method comprising:

reading multiplexed information from a recording medium;

demultiplexing the multiplexed information into compressed data and difference information;

decompressing the compressed data into a decimated image and into moving parameters obtained from the decimated image, the moving parameter information relating to one or more moving parameters of a high definition (HD) image, and the decimated image being obtained by reducing the amount of data of the HD image by frame decimating the HD image;

reconstructing the moving parameters of the HD image from the moving parameters obtained from the decimated image and the difference information; and executing image processing on the decimated image using the moving parameters of the HD image.

18. A recording and playback apparatus for recording an image on a recording medium and playing back the image from the recording medium, the recording and playback apparatus comprising:

a first obtaining unit configured to obtain one or more moving parameters regarding motion from a high definition (HD) image;

a converter configured to convert the HD image into a decimated image composed of a lesser amount of data than the HD image by frame decimating the HD image;

a second obtaining unit configured to obtain one or more moving parameters from the decimated image; and a difference information obtaining unit configured to obtain difference information regarding one or more differences between the moving parameters of the HD image and the moving parameters of the decimated image;

a compressing unit configured to compress the decimated image into compressed data using the moving parameters obtained from the decimated image;

a multiplexing unit configured to multiplex the compressed data and the difference information into multiplexed information;

a recording controller configured to record the multiplexed information on the recording medium;

a reading controller configured to read the multiplexed information from the recording medium;

a demultiplexing unit configured to demultiplex the multiplexed information into the compressed data and the difference information;

a decompressing unit configured to decompress the compressed data into the decimated image and the moving parameters obtained from the decimated image;

a reconstructing unit configured to reconstruct the moving parameters of the HD image from the moving parameters obtained from the decimated image and the difference information; and an image processor configured to execute image processing on the second image read from the recording medium using the moving parameters of the HD image, the moving parameters of the HD image being obtained from the moving parameter information read from the recording medium.

19. A recording apparatus for recording an image on a recording medium, the recording apparatus comprising:

a first obtaining unit configured to obtain one or more moving parameters regarding motion from a high definition (HD) image;

a converter configured to convert the HD image into a decimated image composed of a lesser amount of data than the HD image by frame decimating the HD image;

a second obtaining unit configured to obtain one or more moving parameters from the decimated image; and a difference information obtaining unit configured to obtain difference information regarding one or more differences between the moving parameters of the HD image and the moving parameters of the decimated image;

a compressing unit configured to compress the decimated image into compressed data using the moving parameters obtained from the decimated image;

a multiplexing unit configured to multiplex the compressed data and the difference information into multiplexed information; and a recording controller configured to record the multiplexed information on the recording medium.

20. A playback apparatus for playing back an image, the playback apparatus comprising:

a reading controller configured to read multiplexed information from a recording medium;

a demultiplexing unit configured to demultiplex the multiplexed information into compressed data and difference information;

a decompressing unit configured to decompress the compressed data into a decimated image and into moving parameters obtained from the decimated image, the moving parameter information relating to one or more moving parameters of a high definition (HD) image, and the decimated image being obtained by reducing the amount of data of the HD image by frame decimating the HD image;

a reconstructing unit configured to reconstruct the moving parameters of the HD image from the moving parameters obtained from the decimated image and the difference information; and an image processor configured to execute image processing on the decimated image using the moving parameters of the HD image.

* * * * *